United States Patent [19]
Yoshinaga et al.

[11] Patent Number: 5,712,066
[45] Date of Patent: Jan. 27, 1998

[54] IMAGE FORMING METHOD, RECORDING MEDIUM, AND VISIBLE IMAGE REPRODUCING METHOD

[75] Inventors: Kazuo Yoshinaga, Machida; Shuzo Kaneko, Yokohama; Kazuo Isaka, Tokyo; Yoshio Takasu, Tama, all of Japan

[73] Assignee: Canon Kabushiki Kaisha, Tokyo, Japan

[21] Appl. No.: 446,995

[22] Filed: May 22, 1995

Related U.S. Application Data

[62] Division of Ser. No. 118,360, Sep. 9, 1993, abandoned, which is a continuation of Ser. No. 723,947, Jul. 1, 1991, abandoned.

[30] Foreign Application Priority Data

| Jul. 4, 1990 | [JP] | Japan | 2-175319 |
| Jun. 21, 1991 | [JP] | Japan | 3-175858 |

[51] Int. Cl.$^6$ .................................. G03G 5/04
[52] U.S. Cl. .................. 430/20; 430/902; 349/25; 349/21; 349/183; 365/108
[58] Field of Search .................. 359/43, 44, 45, 359/71, 72, 74, 86, 938; 430/20, 902; 349/20, 21, 22, 24, 25, 183; 365/108

[56] References Cited

U.S. PATENT DOCUMENTS

| 3,623,795 | 11/1971 | Taylor et al. | 350/150 |
| 3,711,713 | 1/1973 | Wysocki et al. | 359/72 |
| 3,804,618 | 4/1974 | Forest et al. | 430/20 |
| 3,806,230 | 4/1974 | Haas | 359/72 |
| 3,951,519 | 4/1976 | Schmidlin et al. | 350/160 |
| 4,012,119 | 3/1977 | Adams et al. | 350/160 |
| 4,093,355 | 6/1978 | Kaplit et al. | 350/334 |
| 4,277,145 | 7/1981 | Hareng et al. | 350/351 |
| 4,598,978 | 7/1986 | Mourey et al. | 350/351 |
| 4,671,642 | 6/1987 | Ohkubo et al. | 355/3 R |
| 4,672,014 | 6/1987 | Joiner et al. | 430/20 |
| 4,692,779 | 9/1987 | Ando et al. | 346/153.1 |
| 4,892,675 | 1/1990 | Nohira et al. | 252/299.01 |
| 4,925,276 | 5/1990 | McMurray, Jr. et al. | 350/342 |
| 4,965,591 | 10/1990 | Kurabayashi et al. | 346/108 |
| 4,995,705 | 2/1991 | Yoshinaga et al. | 350/350 S |
| 5,013,474 | 5/1991 | Arai et al. | 252/299.1 |
| 5,059,000 | 10/1991 | Kaneko et al. | 350/351 |
| 5,066,107 | 11/1991 | Yoshinaga et al. | 359/45 |
| 5,085,498 | 2/1992 | Yamamoto et al. | 359/70 |
| 5,103,332 | 4/1992 | Kaneko et al. | 359/98 |
| 5,157,528 | 10/1992 | Clark et al. | 359/72 |
| 5,227,885 | 7/1993 | Takanashi et al. | 358/209 |
| 5,285,298 | 2/1994 | Kaneko et al. | 359/43 |
| 5,339,306 | 8/1994 | Yoshinaga et al. | 369/275.1 |
| 5,418,096 | 5/1995 | Iijima et al. | 430/20 |

FOREIGN PATENT DOCUMENTS

| 0271900 | 6/1988 | European Pat. Off. . | |
| 0322903 | 7/1989 | European Pat. Off. . | |
| 59-30537 | 2/1984 | Japan | G03C 5/16 |
| 62-174195 | 7/1987 | Japan | B41M 5/26 |
| 64-7022 | 1/1989 | Japan | G02F 1/135 |
| 2-245735 | 10/1990 | Japan | 359/72 |
| 2245735 | 10/1990 | Japan . | |
| WO003578 | 4/1989 | WIPO . | |

OTHER PUBLICATIONS

V. Shibaev et al., Thermotropic Liquid Crystalline Polymers, 14 Polymer Communications vol. 24, pp. 364–365.

*Primary Examiner*—Martin Angebranndt
*Attorney, Agent, or Firm*—Fitzpatrick, Cella, Harper & Scinto

[57] ABSTRACT

Provided an image forming method comprising the steps of;
  forming electric charges on a recording layer by charging the recording medium comprising a conductive substrate and, provided thereon a photoconductive layer and a recording layer containing a polymeric liquid crystal compound, in this order;
  irradiating, after the step of charging, said recording medium with a light corresponding to an image information to move electric charges to said photoconductive layer; and
  writing said image information by means of changing a birefringence of the recording layer caused by said movement of electric charges.

8 Claims, 13 Drawing Sheets

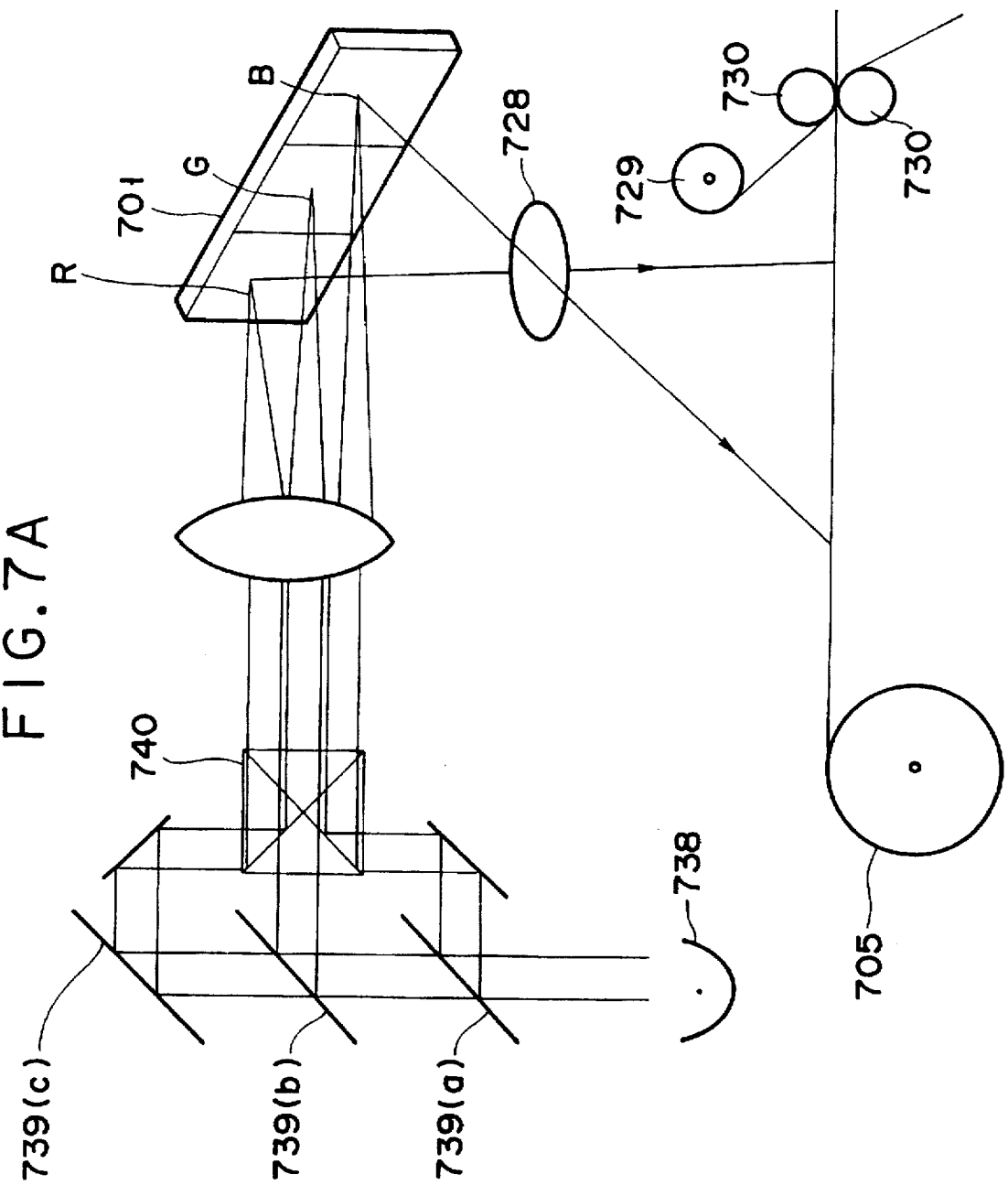

IMAGE FORMING METHOD, RECORDING MEDIUM, AND VISIBLE IMAGE REPRODUCING METHOD

This application is a division of application Ser. No. 08/118,360, filed Sep. 9, 1993, which is a continuation of application Ser. No. 07/723,947, filed Jul. 1, 1991, both now abandoned.

BACKGROUND OF THE INVENTION

1. Field of the Invention

The present invention relates to an image forming method making use of a recording medium comprising a recording layer containing a polymeric liquid crystal compound, and more particularly to an image forming method that utilizes changes in alignment. It also relates to a recording medium that can be used in such an image forming method. It still also relates to a method of reproducing an image formed by such an image forming method.

2. Related Background Art

In a conventional digital electrophotographic system, information signals are recorded on a photosensitive member by operating "on-off" according to information signals while a semiconductor laser beam is scanned on the photosensitive member utilizing a polygonal mirror. In such a system, however, it is necessary to increase the output from a laser or deliver the output for a long time when a highly detailed image is recorded or an image is recorded at a high speed, in particular, when the same image is recorded on a large number of sheets. Hence, a problem has tended to arise on the durability of the laser itself. When images are continuously read in and recorded, the same image is repeatedly read and hence, a large load is applied to an optical scanner.

Moreover, it is difficult for semiconductor lasers to serve as laser light sources for R, G and B corresponding with a color image, making it necessary to provide a large-scale and complicated apparatus.

An analog recording system, on the other hand, is exemplified by a system called a screen process in electrophotography, according to which an intermediate image is obtained on an intermediate transfer medium in the form of ion recording. This system, however, has an instability ascribable to ion charging, and it has been impossible to obtain a long-term memory performance.

A diazo recording system, having been in great demand because of a low running cost, has also been disadvantageous in that no copy can be taken from a three-dimensional object and also disadvantageous in that it can not handle color images.

As for image forming materials that are reversibly image-erasable and repeatedly usable, having a possibility of being utilized as intermediate image holders, what can be considered useful are photochromic materials, thermochromic materials, magnetic recording materials, or liquid crystals sandwiched between glass plates.

However, use of a photochromic material as the intermediate image holder requires irradiation on a photochromic layer in order to optically record an image on a photosensitive layer, since light is used as a means of recording or erasing the image on or from the photochromic material. This tends to cause changes in the photochromic layer or brings about a problem in its durability.

Thermally reversible $Ag_2HgI_4$ has been reported as a thermochromic material. The material of this type, however, has no storage capability, and hence a heater must be always operated so that an image can be retained. There results not only in a large-scale and complicated apparatus but also in a large power consumption.

As a further example, an intermediate image holder making use of a liquid crystal light valve is usually comprised of a low-molecular smectic liquid crystal held between glass substrates, where a laser light absorbing layer is provided in the cell and its homeotropic alignment is brought into a scattered state by heating with external irradiation using a laser, thereby to obtain a contrast. This image holder, however, can not be made to have a large area with ease on account of its structure, or has a complicated structure for an intermediate image holder because erasure is effected by electric-field alignment. It is also difficult to directly write an image using a heating-element head on account of the structure of the device. Taking account of the fact that the image holder can not be made to have a large area, it is attempted to carry out the irradiation using a high-luminescence light source to project an enlarged image. There, however, is the disadvantage such that the irradiation deteriorates the intermediate image because of a poor heat stability.

To cope with such problems, polymeric liquid crystal compounds have been proposed as materials capable of showing superior performances.

Recording mediums making use of polymeric liquid crystal compounds can be exemplified by a thermal write memory disclosed in V. Shibaev, S. Kostromin, N. Plate, S. Ivanov, V. Vestrov and I. Yakovlev, "Thermotropic Liquid Crystalline Polymers. 14", Polymer Communications, Vol. 24, pp. 364–365.

However, because of a delay in response speed that concurrently occurs as increase of molecular weight of the material, these have not been put into practical use. To overcome such disadvantages, it has been proposed to achieve a higher speed by the use of a photoconductive layer (Japanese Patent Application Laid-open No. 64-7022).

The above prior art, however, in which the device is so constituted that a recording layer and the photoconductive layer are held between a pair of electrode substrates, can not be satisfactory for the use of light as a means for writing, in resolution and contrast.

SUMMARY OF THE INVENTION

Accordingly, an object of the present invention is to provide an image forming method that can achieve a stable recording and a good memory performance, in which light is utilized in order to increase sensitivity and by which an image can be formed in a high sensitivity even when the light is in a low output.

Other objects of the present invention is to provide a recording medium that can be suitably used in such an image forming method, and also to provide an image reproducing method capable of obtaining a high-contrast visible image by the use of the image forming method.

The present invention provides a method of forming an image by a process comprising the steps of;

forming electric charges on the recording layer by charging a recording medium which comprises a conductive substrate and, provided thereon a photoconductive layer and a recording layer containing a polymeric liquid crystal compound, in this order;

irradiating, after the step of charging, said recording medium with a light corresponding to an image information to move electric charges to said photoconductive layer; and writing the image information by means of changing a birefringence of the recording layer caused by the movement of electric charges.

As another embodiment of the method, the present invention provides a method of forming an image by a process comprising the steps of;

forming electric charges on said photoconductive layer by charging a medium "A" comprising a conductive substrate and provided thereon a photoconductive layer;

irradiating, after the step of charging, said recording medium with a light corresponding to an image information;

bringing said medium "A" into contact with a medium "B" comprising a conductive substrate and provided thereon a recording layer containing a polymeric liquid crystal compound;

transferring, after the step of irradiating, the electric charges formed on the photoconductive layer of said medium "A", to the recording layer of said medium "B"; and writing the image information by means of changing a birefringence of said recording layer caused by the transfer of electric charges.

The present invention also provides a recording medium comprising a conductive substrate and, provided thereon a photoconductive layer, a dielectric mirror and a recording layer containing a polymeric liquid crystal compound, in this order.

The present invention still also provides an image reproducing method comprising the steps of irradiating light on the recording medium in which an image has been formed by the image forming method described above; and displaying the image information on a screen or transferring the image information to a photosensitive member.

BRIEF DESCRIPTION OF THE DRAWINGS

FIG. 4, FIG. 5, FIGS. 6A and 6B, FIGS. 7A and 7B, FIGS. 8A and 8B, and FIGS. 9A and 9B illustrate Example 1, Example 2, Example 3, Example 4, Example 5 and Example 6 given later, respectively.

DESCRIPTION OF THE PREFERRED EMBODIMENTS

Figure 1A:
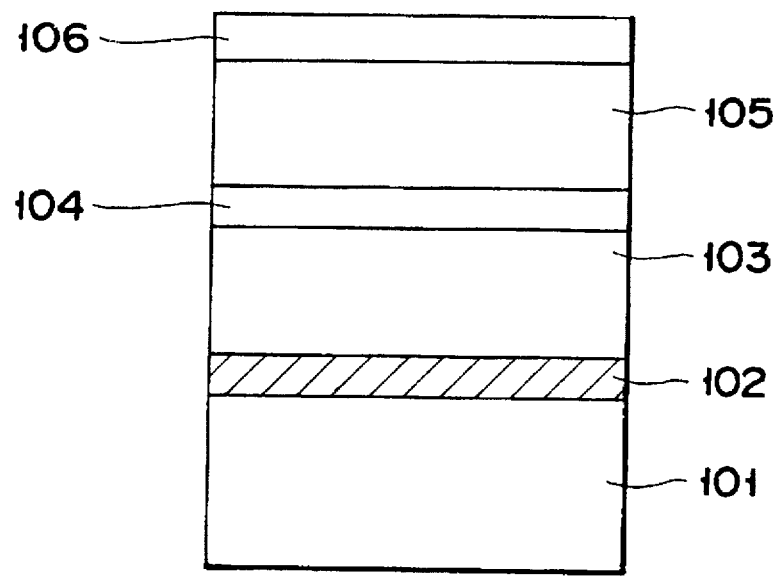
FIGS. 1A to 1D are each a cross section of the recording medium of the present invention.
Figure 1B:
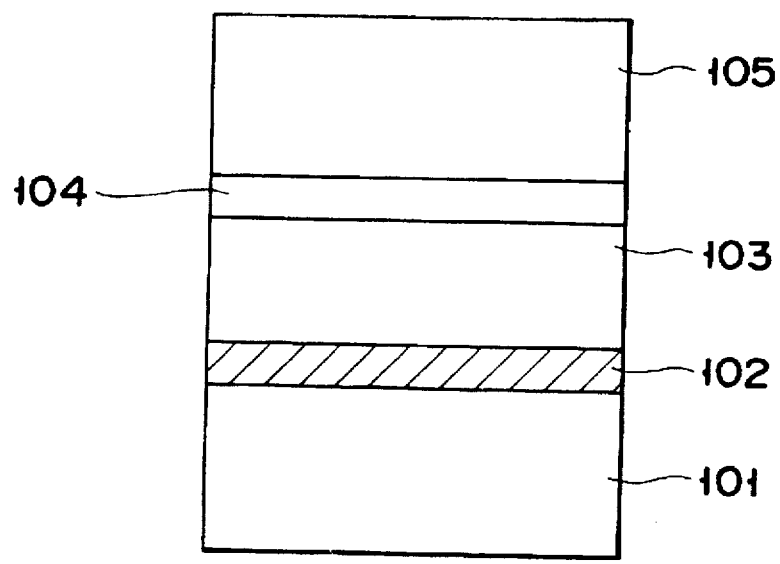
Figure 1C:
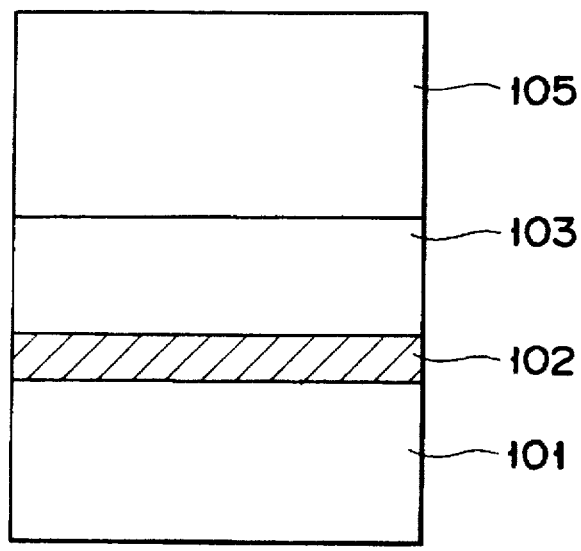

The present invention will be described below in detail.

The recording medium that can be preferably used in the image forming method of the present invention will be described first.

FIGS. 1A to 1D are each a cross section of the recording medium of the present invention.

In the drawings, reference numeral 101 denotes a substrate; 102, a lower electrode; 103, a photoconductive layer; 104, a dielectric mirror; 105, a recording layer; 106, a surface protective layer; and 107 (FIG. 1D), an aligning film. When the substrate 101 is made of a non-conductive material, a conductive layer is provided and the lower electrode is provided thereon. When a conductive material such as a metal is used in the substrate 101, the substrate 101 can serve as the lower substrate 102 at the same time and hence it is unnecessary to additionally provide the lower electrode 102.

In the present invention, it is preferred to use this substrate 101 with a thickness of 10 μm to 2 mm. A substrate with a thickness less than 10 μm is not preferable since the substrate may have an insufficient strength to make it difficult to handle and lacking in durability. A substrate with a thickness more than 2 mm is also not preferable since it results in an increase in weight, etc. and also an increase in cost. The thickness may more preferably be in the range of 20 μm to 1.5 mm.

As materials used for the substrate, when it is made of a metal, it is preferred to use aluminum, copper, brass, stainless steel, etc.

In view of the advantage that a large-area, flexible recording medium can be provided, it is preferred to use a polymer film, which can be exemplified by polyester films such as a polyethylene terephthalate film and a polybutylene terephthalate film, and transparent films such as a polycarbonate film, a polyamide film, a polyimide film, a polymethyl methacrylate film, a methyl methacrylate/styrene copolymer film, a polystyrene film, a polypropylene film, a polyvinyl alcohol film, a polyvinyl chloride film, a polyvinylidene chloride film, a polyvinylidene fluoride film and a polyacrylate film. Examples thereof are by no means limited to these.

These films may be any of oriented films, having been subjected to monoaxial stretching, biaxial stretching or the like, and non-oriented films, either of which can be used. A film having been stretched can have a tensile strength improved twice to four times (in the case of, e.g., polyethylene terephthalate), and is one of preferred films.

In the case when such plastic films are used, the lower electrode 102 is formed by vacuum deposition or the like. For example, aluminum, gold or the like may be vacuum-deposited in a thickness of about 100 Å to about 5,000 Å to give a sufficiently good conductivity.

Next, the photoconductive layer 103 is formed on the substrate 101. The photoconductive layer used in the present invention may preferably be comprised of an inorganic material such as amorphous silicon or BSO (bismuth-silicon oxide) or CdS dispersed in a binder polymer, or an organic photoconductive material dispersed in a binder polymer. When the organic photoconductive material is used, the photoconductive layer may have a double-layer structure comprised of a charge transport layer and a charge generation layer.

In the present invention, the photoconductive layer should preferably have a thickness of 0.1 μm to 100 μm. A thickness less than 0.1 μm may result in an insufficient electrostatic capacitance produced when electric charges move. A thickness more than 100 μm may result in an unsatisfactory sensitivity, resolution and response speed. A more preferred thickness is 1 μm to 50 μm.

In the present invention, after the formation of an image, the image can be fixed, e.g., by selecting glass transition points over the image keeping temperature. Hence, the photoconductive layer can be made transparent to light with wavelengths used when an image is transferred to a photosensitive member, so as to be used as a layer of a transmission type. In such an instance, the light with such wavelengths can be reflected when the dielectric mirror 104 is used.

The dielectric mirror 104 need not be formed. When, however, a writing wavelength is approximate to a reading wavelength, the dielectric mirror 104 may be formed so that writing light can be reflected from the side on which the substrate as shown, for example, in FIG. 1, is provided and reading light can be reflected from the side on which the recording layer is provided. Formation and reproduction of images under such constitution can give a more preferred embodiment.

The recording medium of the present invention is characterized in that the recording layer 105 contains a polymer liquid crystal compound.

This polymer liquid crystal compound is capable of changing its surface state upon selection of any of the following states of alignment, and is usable in a state wherein any of the states of alignment has been fixed by controlling its glass transition point to be higher than room temperature.

States of alignment:

(1) Isotropic phase.
(2) Nematic phase, vertically aligned.
(3) Nematic phase, horizontally aligned.
(4) Smectic phase, vertically aligned.
(5) Smectic phase, horizontally aligned.

The polymer liquid crystal compound used in the recording medium of the present invention may include the following:

(In the following formulas (1) to (13), p=5 to 1,000 and $1 \leq n1 < 15$. In formulas (14) to (17), p=5 to 1,000, p1+p2=5 to 1,000, q=1 to 16, q1=1 to 16 and q2=1 to 16. In formulas (18) to (53), the asterisk * represents an optically active carbon, and n2=5 to 1,000.)

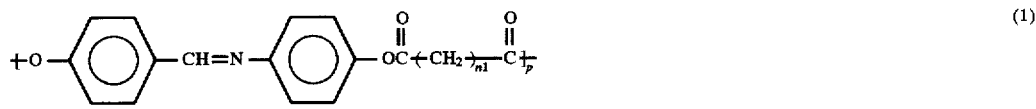

(1)

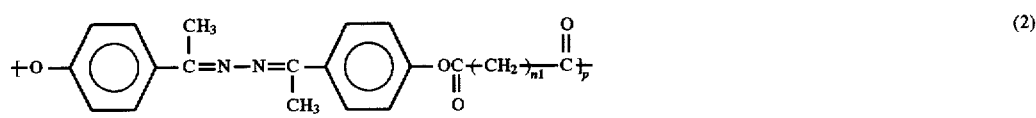

(2)

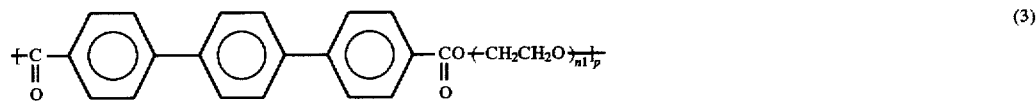

(3)

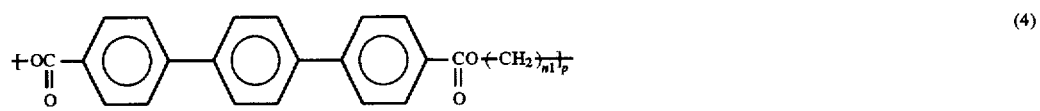

(4)

(5)

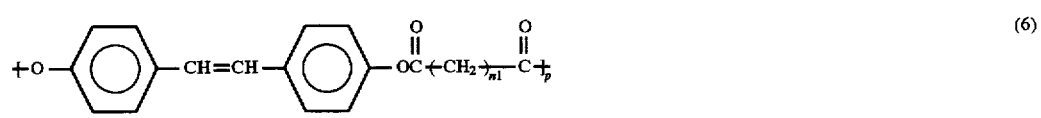

(6)

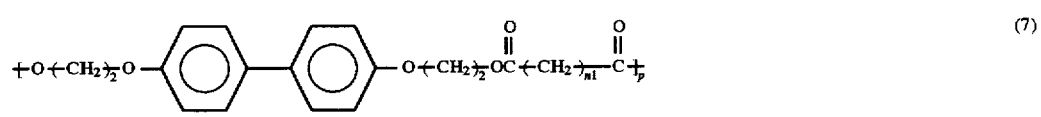

(7)

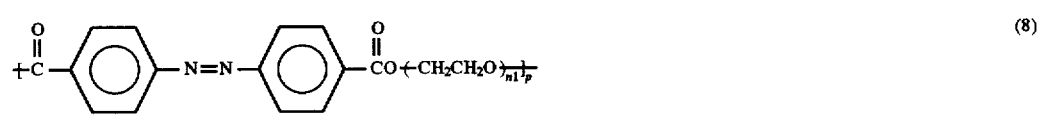

(8)

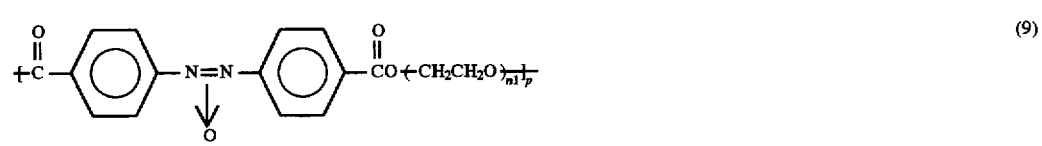

(9)

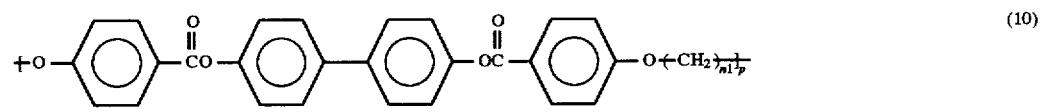

(10)

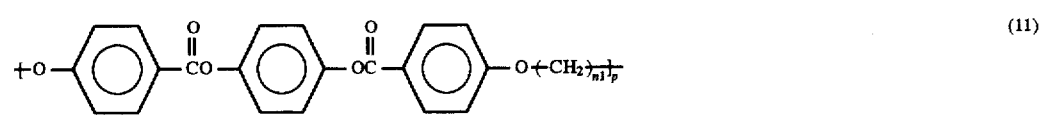

(11)

-continued
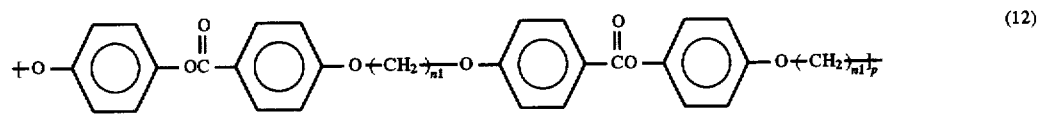 (12)
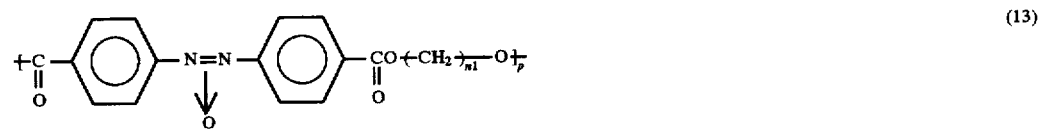 (13)
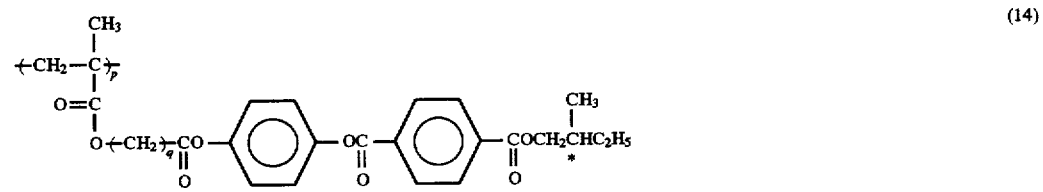 (14)
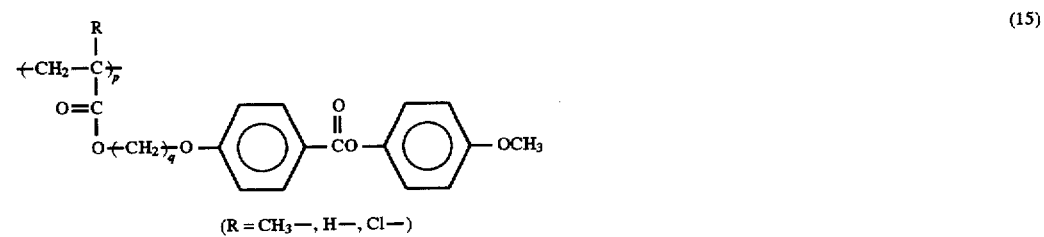 (15)
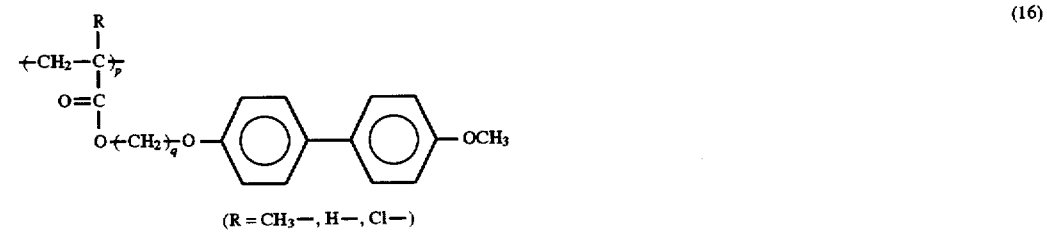 (16)
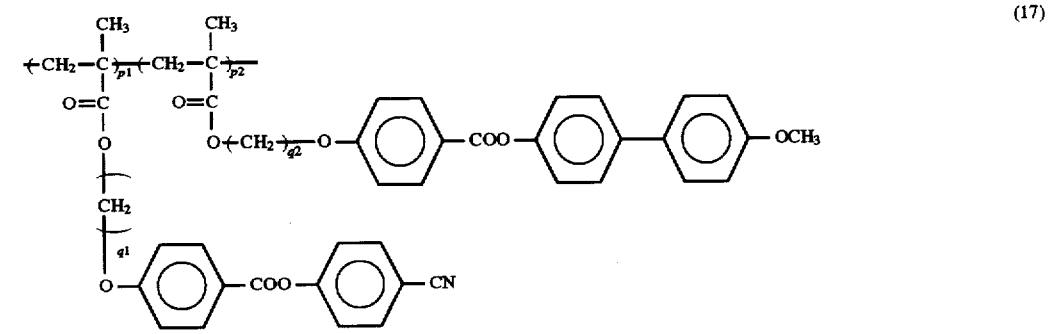 (17)
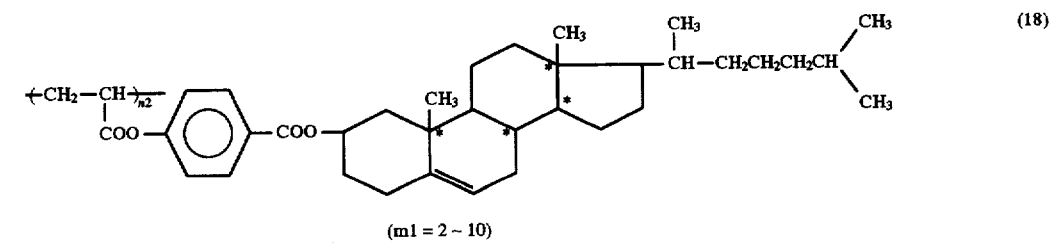 (18)
(m1 = 2 ~ 10)

-continued
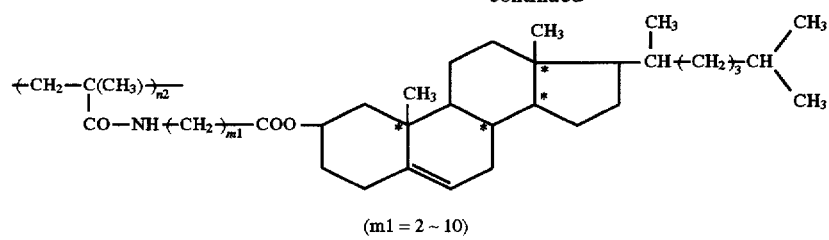
(m1 = 2 ~ 10)
(19)
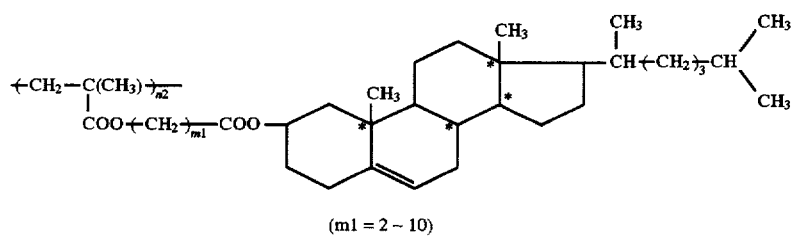
(m1 = 2 ~ 10)
(20)
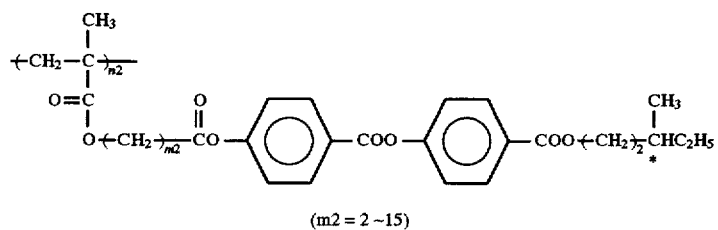
(m2 = 2 ~15)
(21)
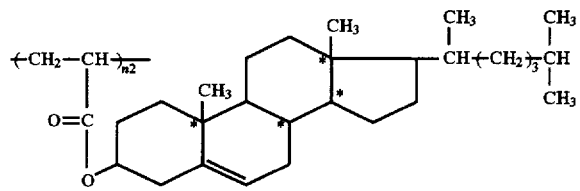
(22)
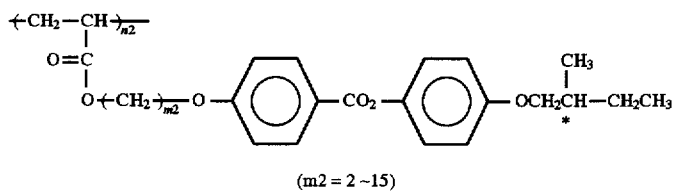
(m2 = 2 ~15)
(23)
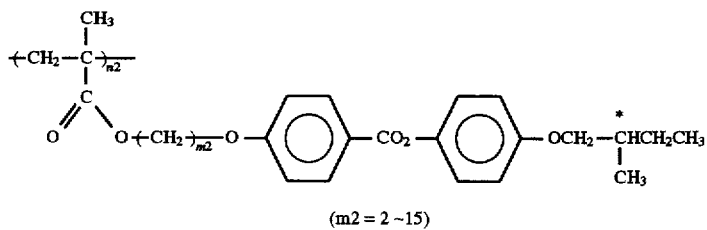
(m2 = 2 ~15)
(24)
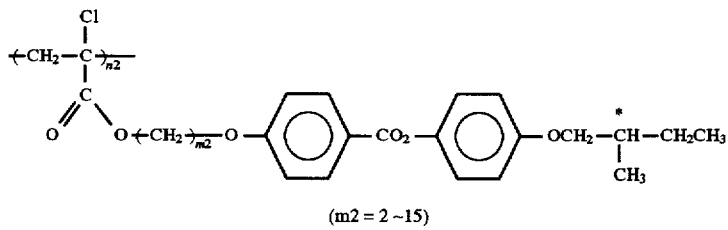
(m2 = 2 ~15)
(25)

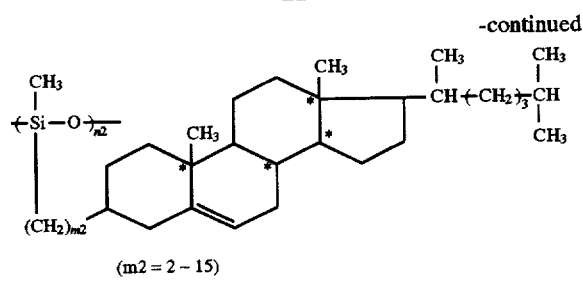
(26)
(m2 = 2 ~ 15)
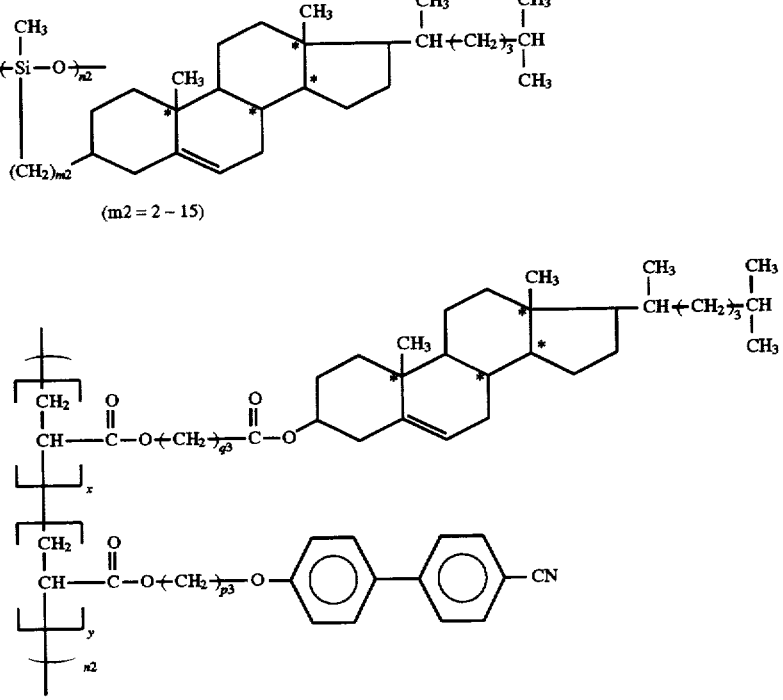
(27)
(x + y = 1, q3 = 1 ~ 10, p3 = 1 ~ 10)
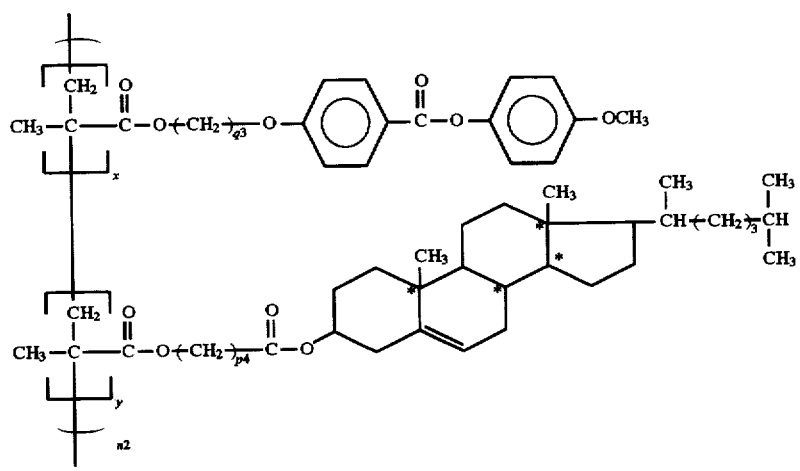
(28)
(x + y = 1, q3 = 1 ~ 10, p4 = 1 ~ 15)
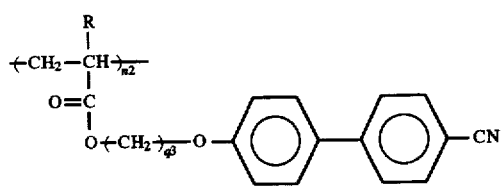
(29)
(R = CH$_3$—, H—, Cl—)
(q3 = 1 ~ 10)

-continued
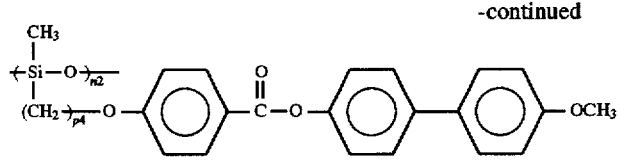
(p4 = 1 ~ 15)
(30)
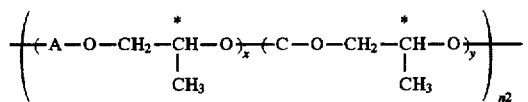
(31)
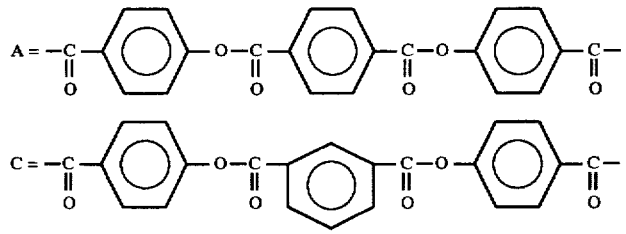
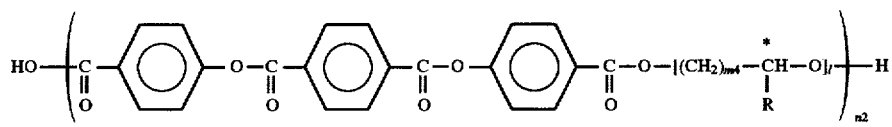
(m4 = 1 ~ 3, l = 1 ~ 20)
(32)
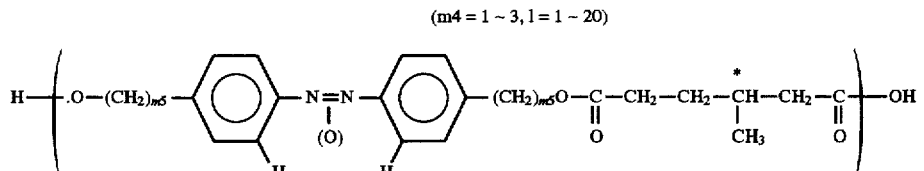
(m5 = 0 ~ 5)
(33)
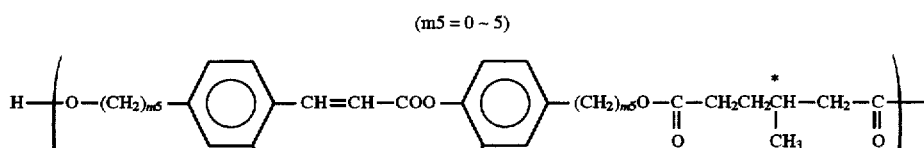
(m5 = 0 ~ 5)
(34)
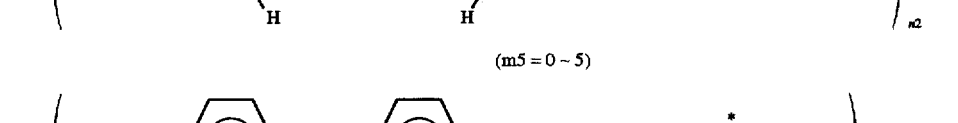
(m5 = 0 ~ 5)
(35)
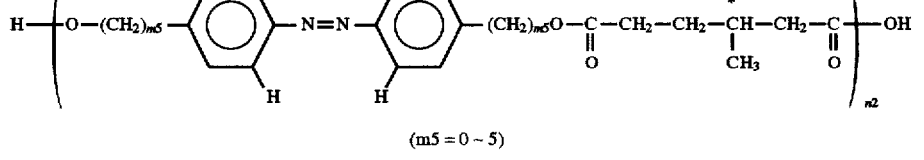
(m5 = 0 ~ 5)
(36)
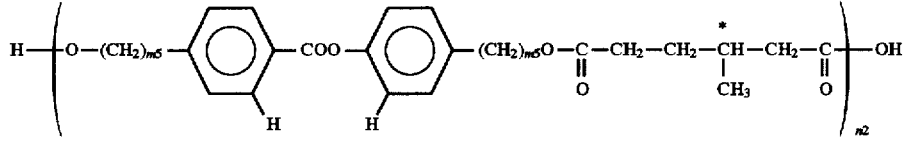
(37)

The above polymer liquid crystal compounds may be used alone or can be used by mixture or copolymerization of two or more kinds. A low-molecular liquid crystal compound may also be mixed so long as memory stability is not damaged. In the present invention, the polymer liquid crystal compound refers to a compound wherein the repeating unit of a chain containing a mesogen group is not less than 5. The low-molecular liquid crystal compound refers to a compound wherein the repeating unit is 1. In this instance, in a polymer liquid crystal composition, the low-molecular liquid crystal compound may preferably be added in an amount of 10% by weight to 80% by weight. Its addition in an amount less than 10% by weight may make insufficient the decrease in viscosity and improvement in alignment that are attributable to the addition of the low-molecular liquid crystal compound. Its addition in an amount more than 80% by weight may result in a decrease in resistance to bring about an undesirable response.

The low-molecular liquid crystal compound may also be used as a mixture of two or more kinds.

Examples of the low-molecular liquid crystal compound specifically used are shown below. Examples thereof are by no means limited to these.

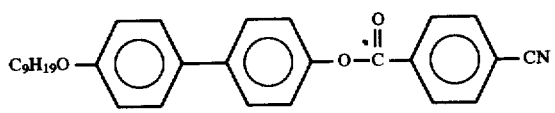 (I-1)

4'-n-Nonyloxy-4-biphenyl-4-cyanobenzoate

Isotropic phase→nematic phase→smectic C phase.

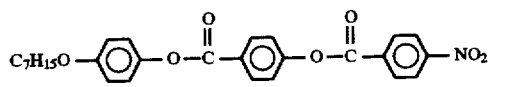 (I-2)

4'-n-Heptylphenyl-4-(4'-nitrobenzoyloxy) benzoate (DB$_7$NO$_2$)

Isotropic phase→nematic phase→smectic A phase.

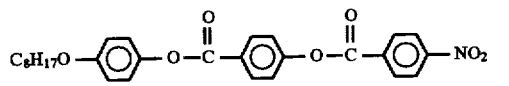 (I-3)

4'-n-Octylphenyl-4-(4'-nitrobenzoyloxy) benzoate (DB$_8$NO$_2$)

Isotropic phase→nematic phase→smectic A phase→smectic C phase.

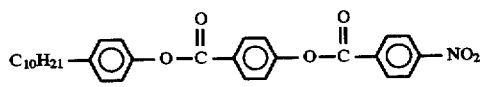 (I-4)

4'-n-Decylphenyl-4-(4'-nitrobenzoyloxy) benzoate (DB$_{10}$NO$_2$)

Isotropic phase→nematic phase→smectic A phase→smectic C phase.

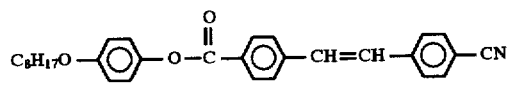 (I-5)

trans-4-(4"-Octyloxybenzoyloxy)-4'-cyanostilbene (T8)

Isotropic phase→nematic phase→smectic A$_1$ phase→smectic A$_2$ phase.

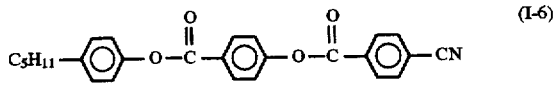 (I-6)

4-n-Pentylphenyl-4-(4'-cyanobenzoyloxy) benzoate (DB$_6$CN)

Isotropic phase→nematic phase→smectic→phase.

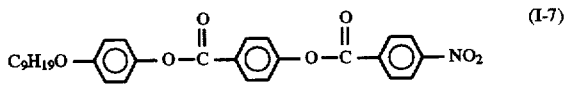 (I-7)

4-n-Nonyloxyphenyl-4-(4'-nitrobenzoyloxy) benzoate (DB$_9$ONO$_2$)

Isotropic phase→nematic phase→smectic A phase→smectic C phase.

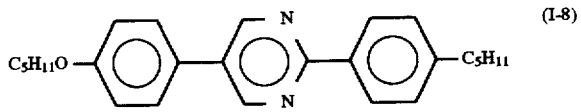 (I-8)

2-(4'-n-Pentylphenyl)-5-(4"-n-pentyloxyphenyl) pyrimidine

Isotropic phase→smectic A phase→smectic C phase→smectic F phase→smectic G phase.

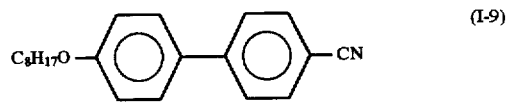 (I-9)

4-Cyano-4'-n-octyloxybiphenyl (8OCB)

Isotropic phase→nematic phase→smectic A phase.

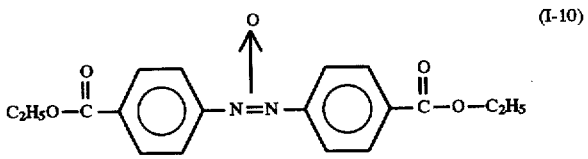 (I-10)

Ethyl-4-azobenzoate

Isotropic phase→smectic A phase.

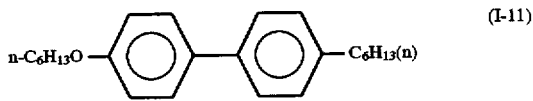 (I-11)

4-n-Hexyl-4'-hexyloxybiphenyl

Isotropic phase→smectic B phase→smectic E phase.

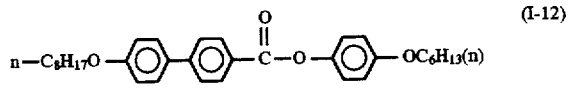 (I-12)

4-n-Hexyloxyphenyl-4'-n-octyloxybiphenyl-4-carboxylate

Isotropic phase→nematic phase→smectic A phase→smectic C phase→smectic B phase.

Di-n-octyl-4,4'-terphenyldicarboxylate (I-13)

Isotropic phase→smectic A phase→smectic C phase.

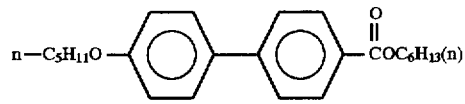

n-Hexyl-4'-n-pentyloxybiphenyl-4-carboxylate (650BC) (I-14)

Isotropic phase→smectic A phase→smectic B phase→smectic E phase.

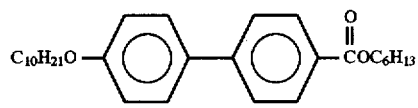

4-n-Hexyl-4'-n-decyloxybiphenyl-4-carboxylate (I-15)

Isotropic phase→smectic A phase→smectic C phase.

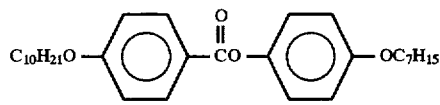

4-n-Heptyloxyphenyl-4-n-decyloxybenzoate (I-16)

Isotropic phase→smectic A phase→smectic C phase.

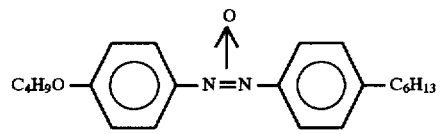

4-Hexyl-4'-butyloxyazoxybenzene (I-17)

Isotropic phase ⇌ 90° C. N ⇌ 27° C. Cryst.

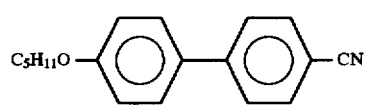

Pentylcyanobiphenyl (I-18)

Isotropic phase ⇌ 35° C. N ⇌ 24° C. Cryst.

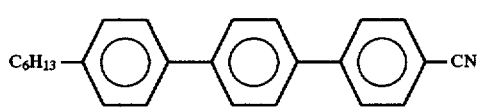

(I-19)

Hexylcyanoterphenyl

Isotropic phase ⇌ 228° C. N ⇌ 125° C. Cryst.

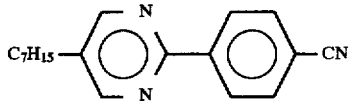

Heptylcyanophenylpyrimidine (I-20)

Isotropic phase ⇌ 50° C. N ⇌ 44° C. Cryst.

As the polymer liquid crystal compound used in the recording layer of the present invention, a ferroelectric polymer liquid crystal compound is preferred in view of quick response, bistability, and memory property.

The ferroelectric polymer liquid crystal compound usable in the present invention may preferably has a chiral smectic phase. It may more preferably has an SmC* phase, an SmH* phase, an SmI* phase, an SmJ* phase or an SmG* phase.

The ferroelectric polymer liquid crystal compound used may have a structure of a main-chain type, a side-chain type or a main-chain/side-chain type. As the main-chain type ferroelectric polymer liquid crystal compound, it is possible to use those of a polyester type, a polyether type, a polyazomethine type, a polythioester type, a polythioether type, a polysiloxane type, a polyamide type or a polyimide type. As the side-chain type ferroelectric polymer liquid crystal compound, it is possible to use those of a polymethacrylic type, a polyacrylic type, a polychloroacrylic type or a polyether type.

The above main-chain type, side-chain type or main-chain/side-chain type ferroelectric polymer liquid crystal compounds may be used alone, or may be used by mixture or copolymerization thereof with two or more of the same type or different type of polymer liquid crystal compound.

Some examples of the ferroelectric polymer liquid crystal compound usable in the present invention are shown below. Examples thereof are by no means limited to these.

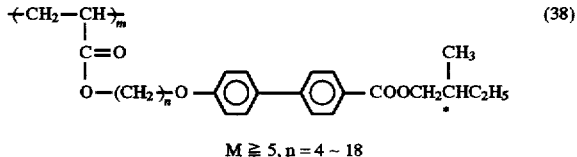

M ≧ 5, n = 4 ~ 18 (38)

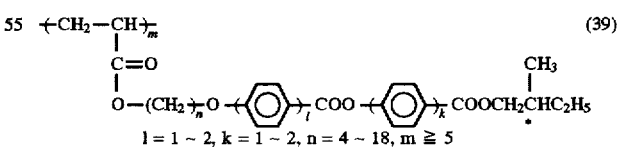

l = 1 ~ 2, k = 1 ~ 2, n = 4 ~ 18, m ≧ 5 (39)

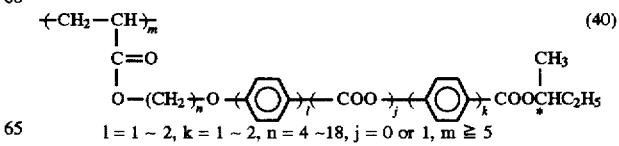

l = 1 ~ 2, k = 1 ~ 2, n = 4 ~ 18, j = 0 or 1, m ≧ 5 (40)

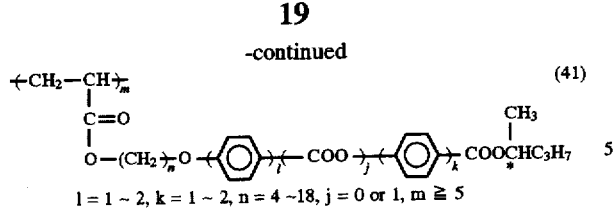
(41)
l = 1~2, k = 1~2, n = 4~18, j = 0 or 1, m ≧ 5
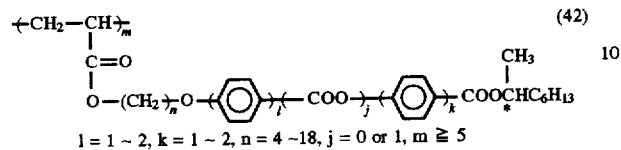
(42)
l = 1~2, k = 1~2, n = 4~18, j = 0 or 1, m ≧ 5
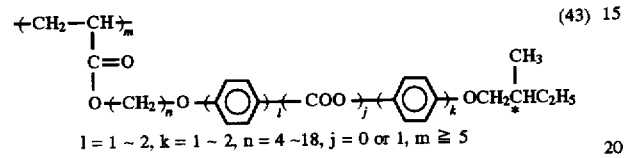
(43)
l = 1~2, k = 1~2, n = 4~18, j = 0 or 1, m ≧ 5
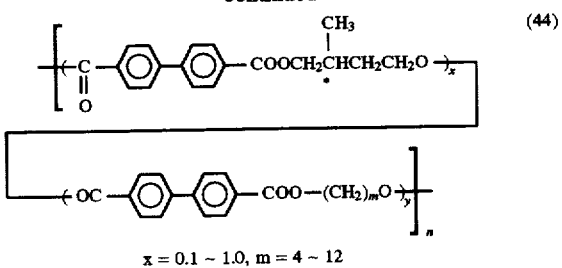
(44)
x = 0.1~1.0, m = 4~12
It is also possible to use an optically active polymer liquid crystal compound capable of rendering ferroelectric properties as a result of blending or the like.
Such a compound may specifically include the following:
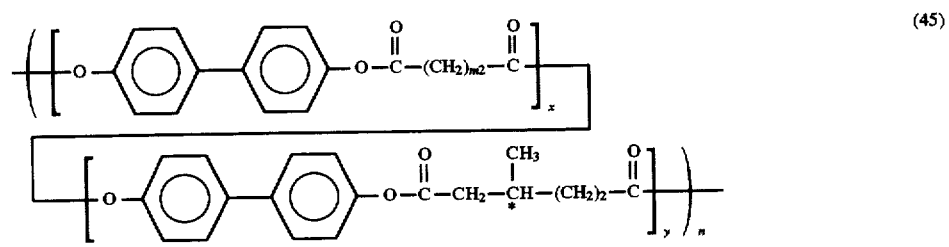
(45)
(m2 = 2~15, x + y = 1)
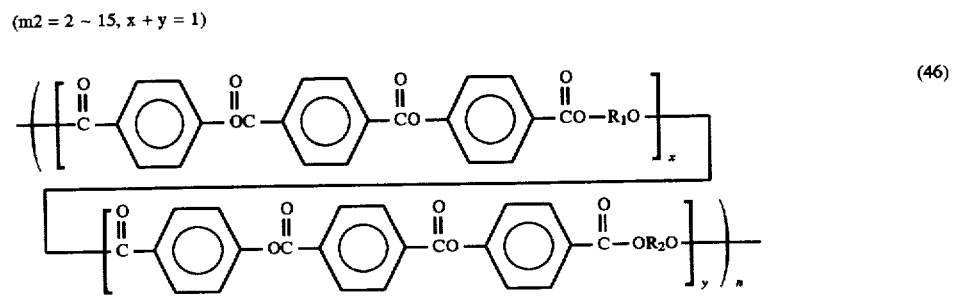
(46)
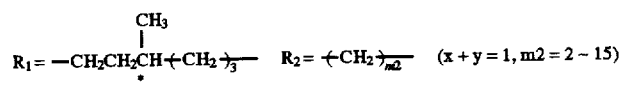
$R_1 = -CH_2CH_2CH(CH_3)(CH_2)_3-$  $R_2 = -(CH_2)_{m2}-$  (x + y = 1, m2 = 2~15)
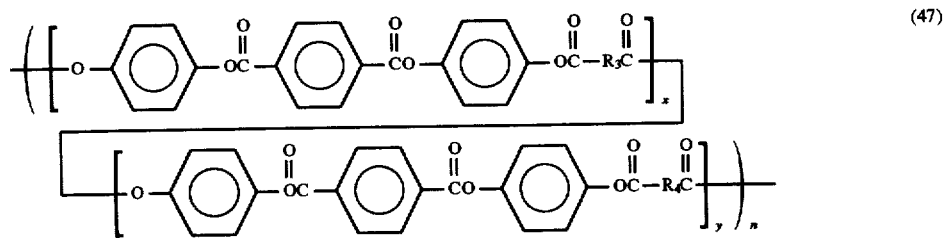
(47)
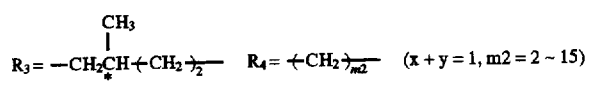
$R_3 = -CH_2CH(CH_3)(CH_2)_2-$  $R_4 = -(CH_2)_{m2}-$  (x + y = 1, m2 = 2~15)

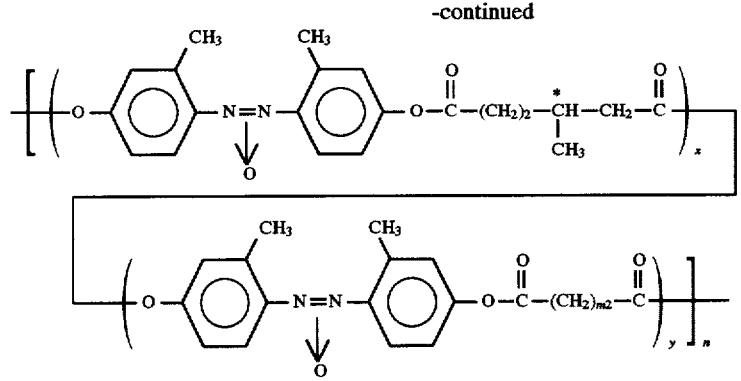
(48)
(x + y = 1, m2 = 2 ~ 15)
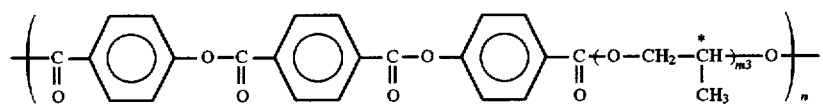
(49)
(m3 = 1 ~ 5)
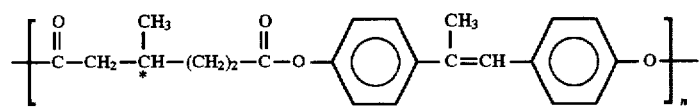
(50)
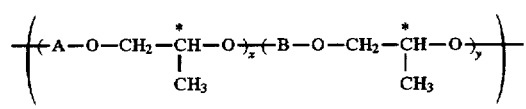
(51)
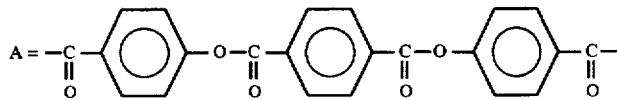
(x + y = 1)
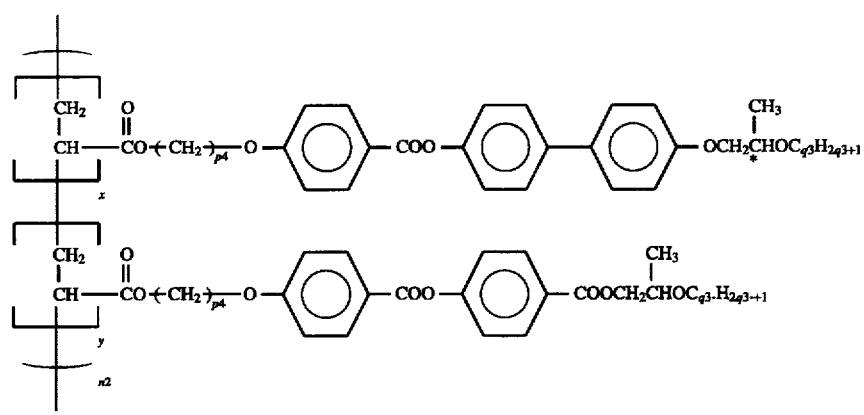
(52)
(x + y = 1, p4, p4' = 1 ~ 15, q3, q3' = 1 ~ 10)

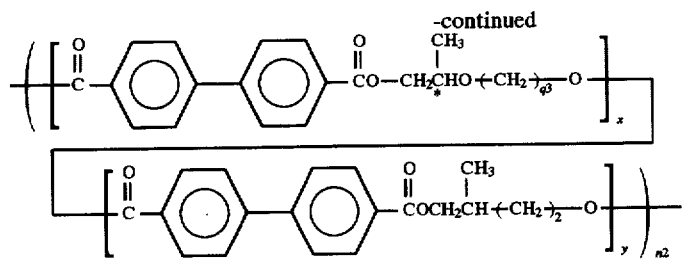

(q3 = 1 ~ 10, x + y = 1)

In the present invention, the above ferroelectric polymer liquid crystal compounds can be used alone or in combination.

In the present invention, a polymeric liquid crystal composition comprising the ferroelectric polymer liquid crystal compound and the low-molecular liquid crystal compound can be used in a ferroelectric polymer liquid crystal layer. The low-molecular liquid crystal compound used may preferably be a ferroelectric liquid crystal compound, but need not be the ferroelectric liquid crystal compound so long as the properties of the ferroelectric polymeric liquid crystal compound are not damaged.

Regarding the instance where the low-molecular liquid crystal compound shows ferroelectric properties, examples of such a compound are also shown below.

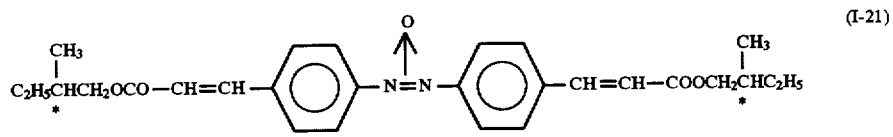

(I-21)

4,4'-Azoxycynnamic acid-bis(2-methylbutyl) ester

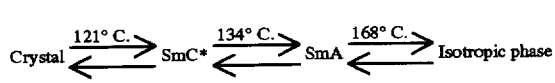

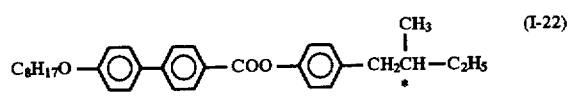

(I-22)

4-(2'-Methylbutyl)phenyl-4'-octyloxybiphenyl-4-carboxylate

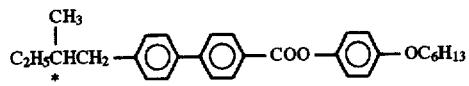

(I-23)

4-Hexyloxyphenyl-4-(2"-methylbutyl)biphenyl-4'-carboxylate

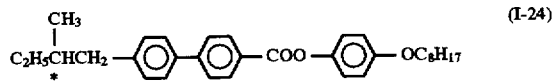

(I-24)

4-Octyloxyphenyl-4-(2"-methylbutyl)biphenyl-4'-carboxylate

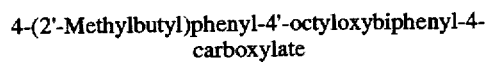

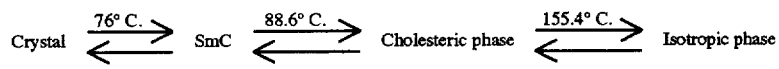

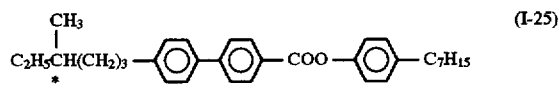

4-Hexyloxyphenyl-4-(2"-methylbutyl)biphenyl-4'-carboxylate

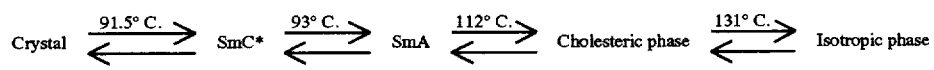

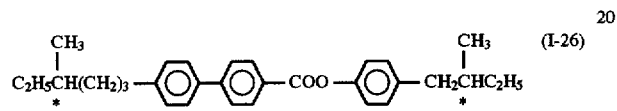

4-(2'-methylbutyl)phenyl-4-(4'-methylhexyl)biphenyl-4'-carboxylate

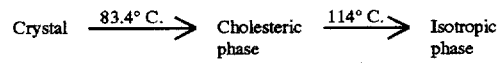

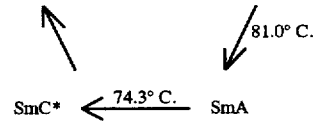

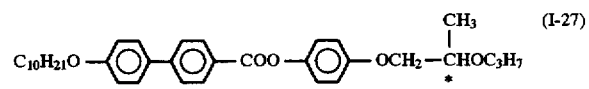

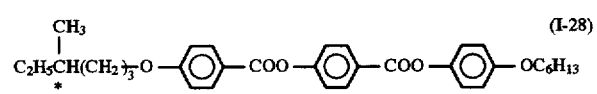

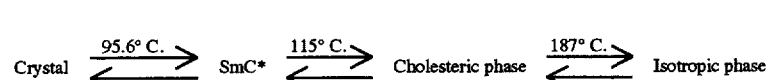

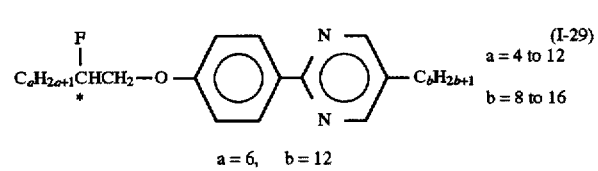

-continued

Crystal $\xrightarrow{56°\,C.}$ SmC* $\xrightarrow{70°\,C.}$ SmA $\xrightarrow{74°\,C.}$ Isotropic phase (I-30)

$C_aH_{2a+1}\overset{*}{C}HCO-O-\bigcirc-\bigcirc\!\!\!\!{}_{N}^{N}-C_bH_{2b+1}$ F (on the CH)

a = 8, b = 10

Crystal $\xleftarrow{33°\,C.}$ SmC* $\xleftarrow{43°\,C.}$ SmA $\xleftarrow{46°\,C.}$ Cholesteric phase $\xleftarrow{48°\,C.}$ Isotropic phase (I-31)

$C_4H_9\overset{*}{C}HCH_2CH_2-O-\bigcirc-O-CO-\bigcirc-\bigcirc-OC_{12}H_{25}$

CF₃

Crystal $\xrightarrow{58°\,C.}$ SmC* $\xrightarrow{120°\,C.}$ SmA $\xrightarrow{146°\,C.}$ Isotropic phase In the mixture of the ferroelectric polymer liquid crystal compound and the low-molecular liquid crystal compound, the low-molecular liquid crystal compound should preferably be contained in an amount of not more than 40% by weight. An amount more than 40% by weight is not preferable since film strength or film forming properties may be damaged. It should more preferably be in an amount of not more than 20% by weight.

In aligning the polymer liquid crystal compound, it is possible to utilize the surface effect.

For example, an alignment control film can be provided, which is a film formed using an inorganic insulating material such as silicon monoxide, silicon dioxide, aluminum oxide, zirconium oxide, magnesium fluoride, cerium oxide, cerium fluoride, silicon nitride, silicon carbide or boron nitride or an organic insulating material such as polyvinyl alcohol, polyimide, polyamidoimide, polyester imide, polyparaxylene, polyester, polycarbonate, polyvinyl acetal, polyvinyl chloride, polyamide, polystyrene, cellulose resin, melamine resin, urea resin or acrylic resin.

This alignment control film can be obtained by forming the inorganic insulating material or organic insulating material into a film, and thereafter rubbing its surface with velvet, cloth or paper in a given direction.

In the present invention, the alignment control film can also be obtained by forming a film by oblique vacuum deposition using an inorganic insulating material such as SiO or $SiO_2$.

Alternatively, after the inorganic insulating material or organic insulating material as described above has been formed into a film, the surface of the film may be etched by oblique etching, whereby the alignment control effect can be imparted to its surface.

The alignment control film described above may preferably also function as an insulating film. For this purpose, the thickness of this alignment control film may be set within the range of usually 100 Å to 1 μm, and preferably 500 Å to 5,000 Å. This insulating layer has the advantage that it can prevent currents that may be caused by impurities contained therein in a very small amount. Hence, the polymeric liquid crystal compound is not deteriorated even after repeated operations. This alignment control film may be formed in contact with the recording layer 105. For example, it may be formed as shown in FIG. 1D, reference numeral 107.

The polymer liquid crystal compound and the composition comprising it, described above, can be well aligned not only by the aligning methods described above but also by the following aligning methods. As methods that can surely effect molecular alignment, it is preferred to use stretching such as monoaxial stretching, biaxial stretching or inflation stretching or re-alignment by means of shearing. A material having no film properties when used alone and for which it is therefore difficult to be stretched, may be sandwiched between films and then stretched together with the films, whereby the desired alignment can be effected.

Figure 1D:
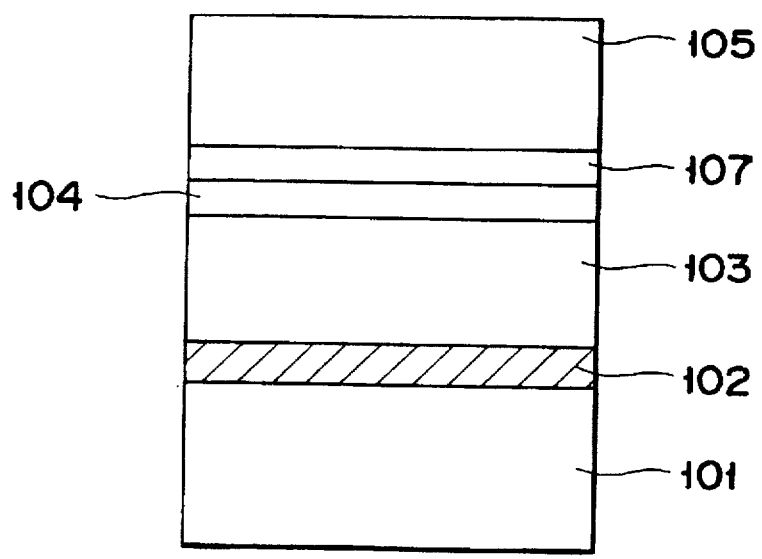

In the present invention, when the recording layer 105 has a low volume resistivity, the protective layer 106 as shown in FIG. 1A may be provided so that it can be prevented from deterioration due to inclusion of ions into the recording layer 105. For this reason, the protective layer 106 should have a volume resistivity of not less than $10^{12}$ Ω.cm, and preferably not less than $10^{14}$ Ω.cm, and it is preferred to use epoxy resin, silicone resin, polystyrene, polymethacrylate, polyvinyl chloride, polytetrafluoroethylene, etc.

The protective layer should preferably have a thickness of 0.1 μm to 10 μm. A thickness less than 0.1 μm and a thickness more than 10 μm are not preferred since the may result in an insufficient resistivity and the letter may cause an expansion of electric fields ascribable to surface charges.

In the recording medium of the present invention, a light absorbing layer may be additionally provided. Alternatively, a recording medium comprising a recording layer in which a laser light absorbing compound has been dispersed or dissolved may be used. In other words, the recording medium should be constituted in the above way when laser beams are used in the step of heating the recording layer at the state where an image is formed according to the present invention.

When a display surface is affected by the light absorbing layer or the light absorbing compound, those having no absorption at the visible light region should be used.

The laser light absorbing compound that may be added to the recording layer includes, for example, azo compounds, bisazo compounds, trisazo compounds, anthraquinone compounds, naphthoquinone compounds, phthalocyanine compounds, naphthalocyanine compounds, tetrabenzoporphiline compounds, aminium salt compounds, diimonium salt compounds and metal chelate compounds.

Of the above laser light absorbing compounds, compounds for semiconductor lasers have an absorption at the near infrared region and are useful as stable light absorbing coloring matters. They also have a good compatibility with or dispersibility in the recording layer. Some of them have a dichroism. Mixing of any of these compounds with a dichroism into the recording layer makes it also possible to obtain a thermally stable, host-guest type recording medium.

The above compound may be contained in the recording layer in combination of two or more kinds.

The above compound may also be used in combination with a different type of near infrared absorbing coloring matter or dichroic coloring matter. The near infrared absorbing coloring matter that can be preferably used in combination can be typically exemplified by coloring matters such as cyanine, merocyanine, phthalocyanine, tetrahydrocholine, dioxazine, anthaquinone, triphenodithiazine, xanthene, triphenylmethane, pyrylium, croconium, azulene, and triphenylamine.

The above compound may be added to the recording layer in an amount of 0.1% by weight to 20% by weight in approximation, and preferably 0.5% by weight to 10% by weight.

The image forming method of the present invention will be described below with reference to FIGS. 2A to 2E and 3A to 3E.

Figure 2A:
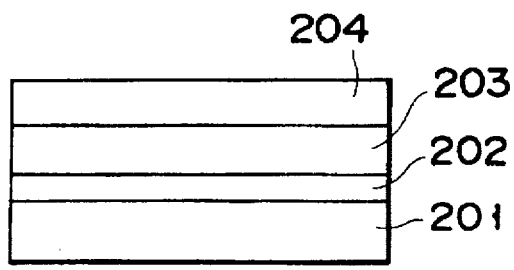
FIGS. 2A to 2E and 3A to 3E each show a flow chart of the image forming method of the present invention.

FIG. 2A cross-sectionally illustrates a recording medium having a photoconductive layer 203. A recording layer 204 containing the polymeric liquid crystal compound should preferably have been horizontally aligned when it has Δε>0, and vertically aligned when it has Δε<0. Reference numeral 201 denotes a substrate film; and 202, a lower electrode.

Figure 2B:
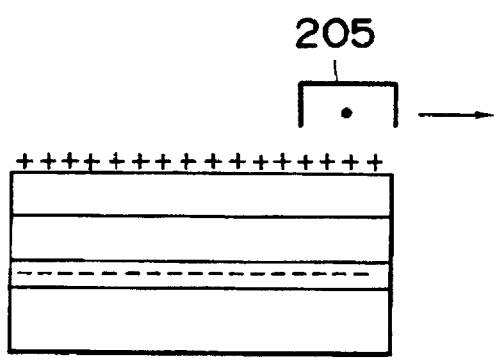

As shown in FIG. 2B, upon overall charging using a corona assembly 205, charges are generated in the lower electrode 202 and on the surface of the recording layer 204. At this time, the charging should preferably be at a voltage of 100 V to 8,000 V.

Figure 2C:
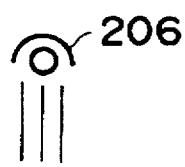
Figure 2C:
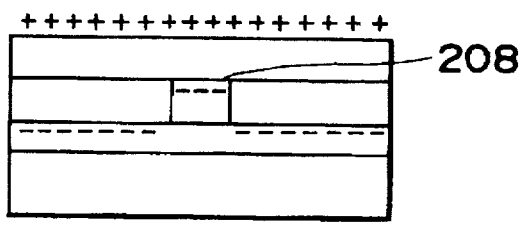

Next, as shown in FIG. 2C, image information is exposed to light using an exposure assembly 206. This exposure is carried out using light with a wavelength to which the photoconductive layer 203 has a sensitivity, and may be carried out on the whole area by the use of a mask or carried out by laser beam scanning. As a result of this exposure, the charges present in the lower electrode 202 move at an exposed area 208 and come to exist at the interface between the photoconductive layer 203 and the recording layer 204. This brings about an increase in electrostatic capacitance at the exposed area.

The movement of charges to the photoconductive layer causes changing birefringence of the recording layer to change the molecular orientation, so that the writing can be effected.

The molecular orientation as described in the present invention which brings a change of the birefringence includes a partial change of orientation of a mesogen that constitutes the polymer liquid crystal. In some instances, however, depending on the type of the recording layer, it is better to carry out the writing in a heated state by selecting temperature ranges in which the polymer liquid crystal has a liquid crystal phase and glass transition points. In a preferred embodiment, from the viewpoints of writing speed and readiness in controlling writing conditions, the heating is carried out using a heater 207 (a thermal head) as shown in FIG. 2E, to cause the molecular orientation to change.

Figure 2D:
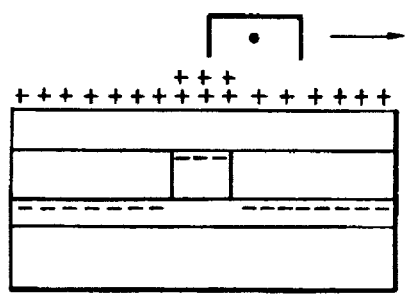
Figure 2E:
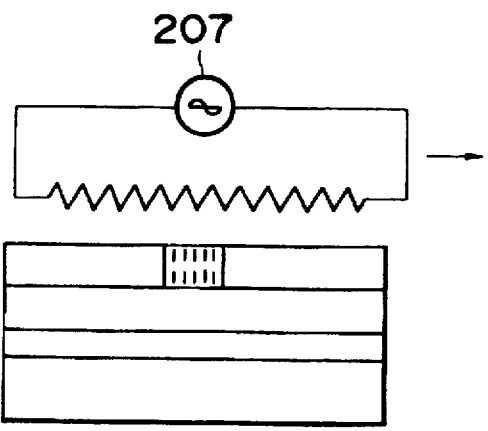

The heating shown in FIG. 2E is carried out at a temperature set within the liquid crystal temperatures.

In a more preferred embodiment, after the step shown in FIG. 2C, the charging may be repeated as shown in FIG. 2D. This brings about an increase in electrostatic capacitance, according to which the charges at the exposed area increase.

The recording medium may be brought into the state as described above, to cause the molecular orientation to change. Alternatively, in the state as described above, it may also be heated to a temperature higher than the glass transition temperatures, using the heater 207 as shown in FIG. 2E, to cause the molecular orientation to change to effect writing.

As a means for the heating, the thermal head as shown in FIG. 2E or a laser beam (not shown) may be used.

As a laser beam source, it is preferred to use a gas laser such as an He—Ne gas laser, an $Ar^{2+}$ gas laser or an $N_2$ gas laser, a solid laser such as a ruby laser, a glass laser or a YAG laser, or a semiconductor laser. It is also preferred to use a semiconductor laser with a wavelength region of 600 nm to 1,600 nm. It is particularly preferred to use a semiconductor laser with a wavelength region of 700 nm to 900 nm.

In the case when the laser beam is used, the light absorbing layer is additionally provided. Alternatively, the recording medium comprising a recording layer in which a laser light absorbing compound has been dispersed or dissolved is used.

FIGS. 3A to 3E illustrate a process by which a surface electrostatic image on a photoconductive layer 303 is contact-transferred to a recording layer 306 containing a polymer liquid crystal compound. This is a process commonly called TESI (transfer of electrostatic image) process. In the drawings, reference numeral 301 or 301' denotes s substrate film; 302 or 302', a lower electrode; 304, a corona assembly; 305, an exposure assembly; and 307, a power source.

Figure 3A:
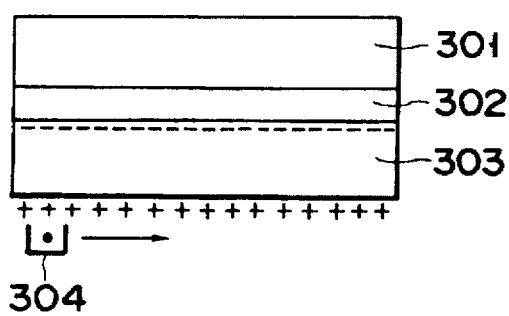
Figure 3B:
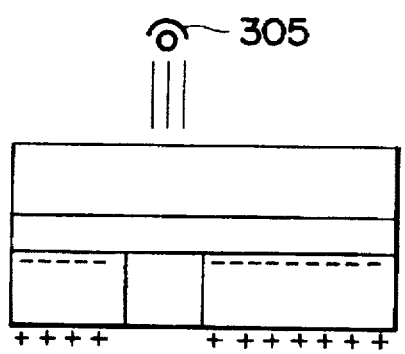
Figure 3C:
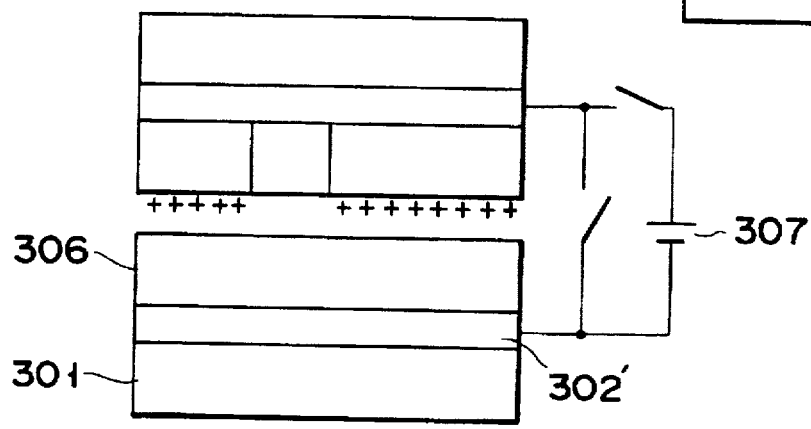
Figure 3D:
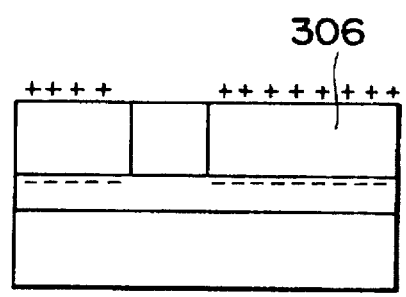

The surface electrostatic image is formed in the manner as shown in FIGS. 3A and 3B, and then, as shown in FIG. 3C, a voltage of 500 V to 5,000 V is applied across the lower electrode 302 of the substrate provided with the photoconductive layer and the lower electrode 302' of the substrate having the recording layer 306, in the state of which the both are brought into contact and then separated, so that the surface electrostatic image can be transferred to the substrate having the recording layer 306.

The transfer of charges causes the birefringence of the recording layer to change, so that the writing can be effected.

Figure 3E:
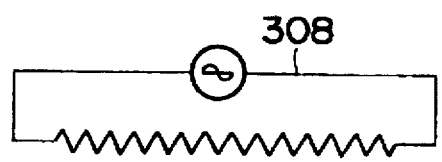
Figure 3E:
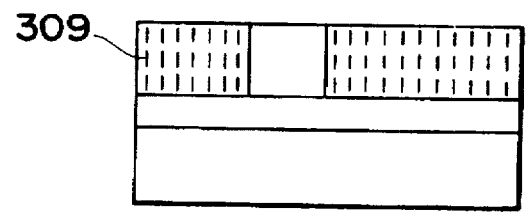

In a more preferred embodiment, this substrate having the recording layer 306 is heated using a heater 308 to cause the orientation of the polymer liquid crystal compound to change, so that an orientation-changed area 309 is formed as shown in FIG. 3E.

The recording medium in which an image has been formed by the image forming method of the present invention is used as the intermediate image holding medium, and the image is displayed on a screen or transferred to a photosensitive member. A visible image can be thus obtained.

A photosensitive member suited for the transfer may include the following:

(a) Electrophotographic photosensitive members, (b) Diazo photosensitive materials, (c) Silver salt photosensitive materials, (d) A capsule sheet photosensitive member coated with microcapsules in which a photocurable resin and a colorless dye are encapsulated, as typically disclosed in Japanese Patent Application Laid-open No. 59-30537.

(e) Photoresist members, (f) A photosensitive member comprising a material reactive to light and heat, in which, when a heat energy and a light energy are applied, the reaction of the material abruptly proceeds to cause irreversible changes in transfer characteristics to form an image because of differences in the above characteristics, corresponding with image signals (Japanese Patent Application Laid-open No. 62-174195).

EXAMPLES

The image forming method and recording medium of the present invention will be described below in greater detail by giving Examples, and also the method of reproducing a visible image will be described.

Example 1

In this example, shown is an example in which the image forming method and recording medium of the present invention are applied to an intermediate image holder used in an electrophotographic image forming process.

According to the present example, it is made possible to record images at a high speed on plural sheets without use of a laser and a precision optical system comprising a polygon mirror, after a process in which, when an initial intermediate image is read in, an optical scanner is driven in a low speed so that a highly detailed image is read in, and the intermediate image is thermally taken onto a polymer liquid crystal in accordance with this image information or image information sent from a memory.

This example will be described below with reference to the apparatus shown in FIG. 4.

In the drawing, the numeral 401 denotes a recording medium, which was prepared in the following way: On a transparent substrate made of glass or the like, a transparent electrode (the lower electrode) was formed in a thickness of 500 Å, and on the transparent electrode a photoconductive layer comprising amorphous silicon was formed in a thickness of 20 μm. Next, a dielectric mirror was formed thereon by vacuum deposition so that light with a wavelength of 550 nm can be reflected. A polyimide aligning film was further formed thereon by baking. On the resulting aligning film, a recording layer comprising a horizontally aligned polymer liquid crystal compound was formed, which was formed in the following way: A polymer liquid crystal compound represented by the following structural formula:

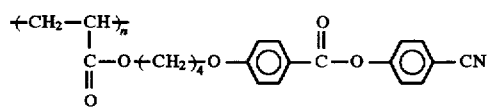

Number average molecular weight Mn: 4,960

Weight average molecular weight Mw: 14,060 (Measured by GPC using a THF solvent)

Glass $\xrightarrow{44°\text{C.}}$ Liquid crystal phase $\xrightarrow{115°\text{C.}}$ Iso.

was dissolved in dichloroethane to give a 20% solution, and the above substrate provided with the stated layers was dipped in (or may be coated with) this solution. The substrate thus coated was left to stand in an oven at 95° C. for 60 minutes.

An ultraviolet-curable silicone resin was then coated on the surface, followed by curing with ultraviolet rays.

Figure 4:
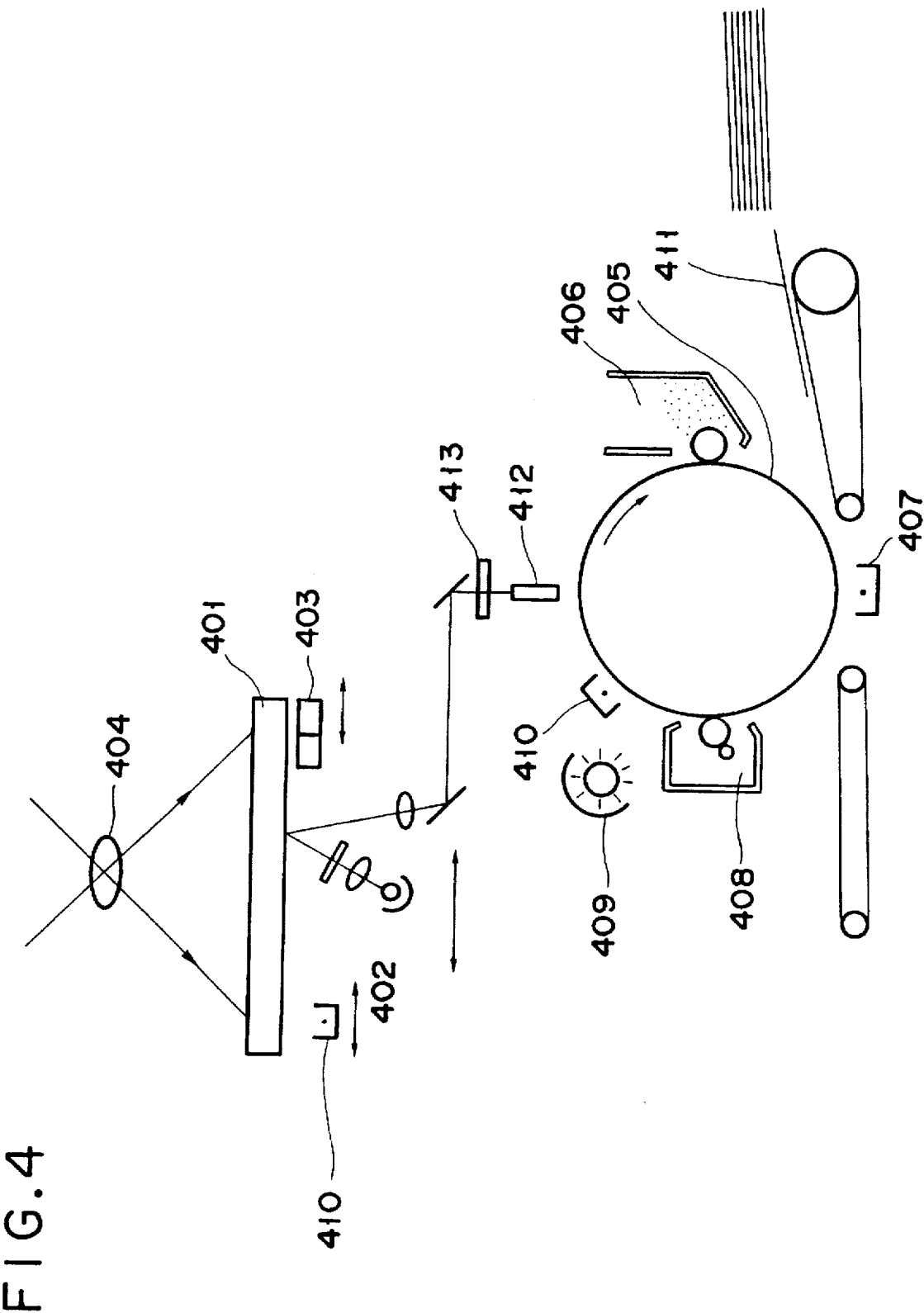

The recording medium 401 is read with an irradiation optical system 402 that is driven in synchronization with an electrophotographic system shown at the lower part of FIG. 4.

A uniform heating-annealing device 403 is comprised of a halogen heater and a plane heater, and the halogen heater is set at about 120° C. and the plane heater at about 85° C.

As the uniform heating-annealing device 403 is moved along the surface of the recording layer, the medium is heated to 115° C. by the halogen heater and is turned transparent on substantially the whole area. As it is passed on the plane heater, re-alignment takes place on the whole area, and an image is thus erased.

Here, the image was recorded according to the process shown in FIGS. 2A to 2E.

An image production process will be described below.
(a) Initial state

The recording layer comprising the polymer liquid crystal compound is in a horizontally aligned state. A photosensitive member 405 is in an uncharged state.
(b) As shown in FIG. 2B, the whole areal charging is carried out using the corona assembly 205, and the image is exposed to light using an exposure system as shown in FIG. 4 by the numeral 404 and in FIG. 2 by the numeral 206, where the charges are transported at the exposed area 208.

Next, the the recording medium is again charged and then heated and cooled using the uniform heating-annealing device 403 in the same way as in the above, so that the exposed area is vertically oriented to give an image that can be read out.

As for the photosensitive member 405, it is primarily charged using the corona assembly 410, where negative charges (or positive charges depending on processes) are applied.
(c) The irradiation optical system is operated to irradiate the recording medium 401 with linearly polarized light. Light reflected therefrom is converged to a selfoc lens 412 through an analyzer 413, and is shed onto the photosensitive member 405 for its exposure.
(d) Corresponding with the charged state on the surface of the photosensitive member 405, a latent image is developed with a toner by means of a developing assembly 406.
(e) The toner on the photosensitive member 405 is transferred to a transfer medium 411 such as paper by means of a transfer device 407. The toner on the transfer medium 411 is thereafter fixed by means of a fixing device (not shown).
(f) The recording medium 401 is turned into horizontal alignment on its whole area by means of the uniform heating-annealing device 403, and brought to the initial state.

The photosensitive member 405, from the surface of which the remaining toner has been removed by means of a cleaner 408, is subjected to whole areal exposure by means of a whole areal exposure device 409, so that the charges on the surface of the photosensitive member 405 are removed. Thus the photosensitive member 405 is brought to the initial state.

In this way, the toner is adhered to the transfer medium corresponding with the unexposed area of the recording layer. A negative image is thus obtained. In this example, it was possible to obtain on the transfer paper a clear image with a white-ground density of 1.1.

Example 2

Figure 5:
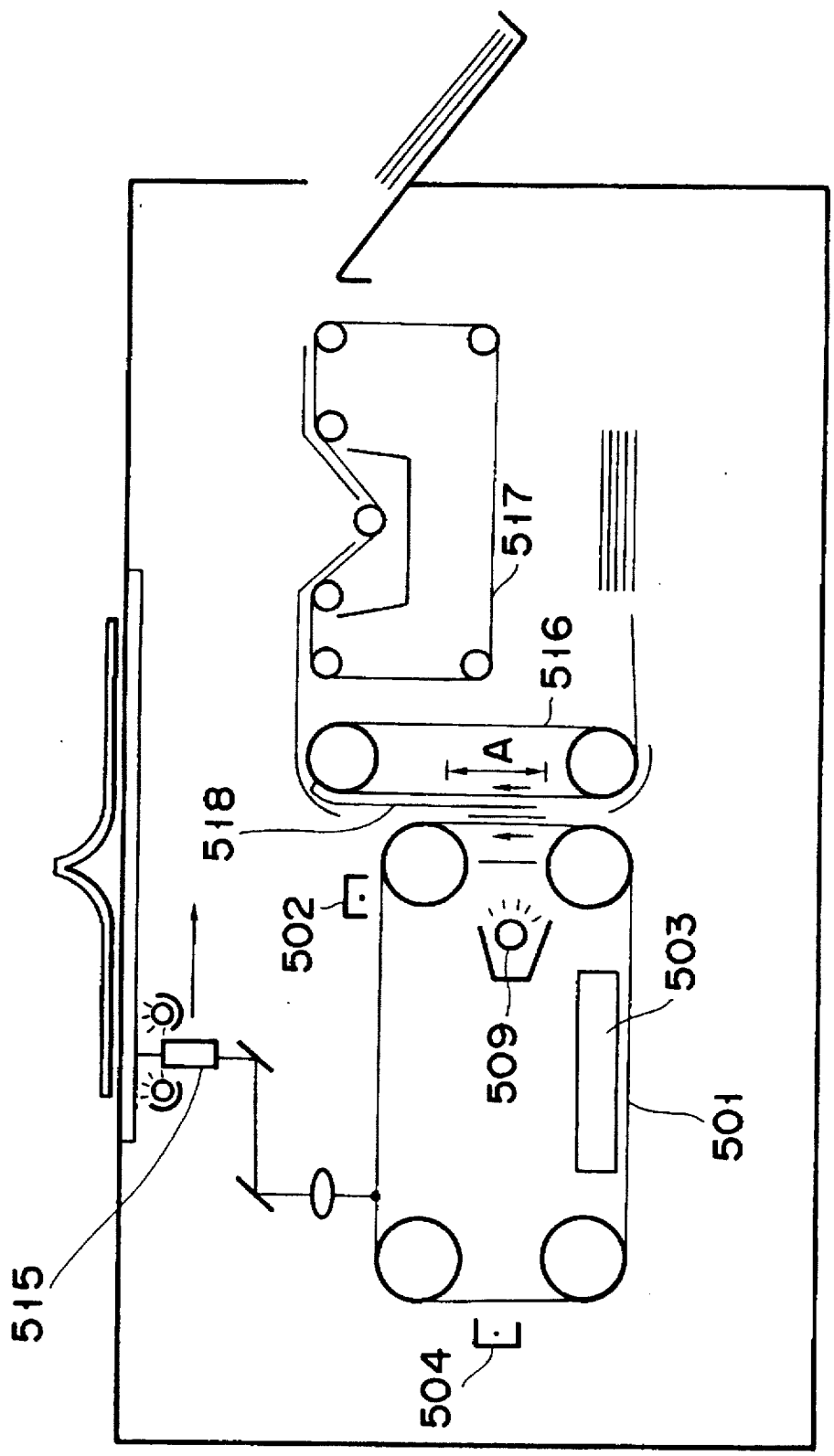

An example in which the image forming method and recording medium of the present invention are applied to an intermediate image holder in an image forming process making used of a diazo photosensitive material will be described with reference to FIG. 5.

According to this example, it is made possible to directly take a copy from a bulky object such as a book, using an image forming apparatus making use of an intermediate image holding method and holder.

In an optical image transfer apparatus shown here, a recording medium 501, an exposure optical system 515 and a uniform heating-annealing device 503 are the same as those in Example 1. An illuminator 509 is set as an ultraviolet generator. This illuminator may be used to subject the whole A4 size sheet to flash exposure to effect plane transfer, or slit exposure to effect whole areal transfer.

The recording medium 501 serving as the intermediate image holder, and transport belts 516 and 517 are synchronizingly driven in the direction of arrows by means of a driving unit (not shown). Reference numeral 502 denotes a corona assembly, which corresponds to the one shown in FIG. 2B. The recording medium 501 in which information has been recorded using the exposure optical system 515 is passed through the place at which a corona assembly denoted as 504 is provided (corresponding to FIG. 2D), and thereafter brought into close contact at the part "A" with a diazo photosensitive sheet 518 transported there by means of a belt 516, where exposure is effected using the illuminator 509.

As the diazo photosensitive sheet, usual sheets commercially available can be used. A sheet coated with a mixture of a diazonium salt and a coupler was used here. In this way, an image with a high contrast was obtained.

Example 3

Figure 6A:
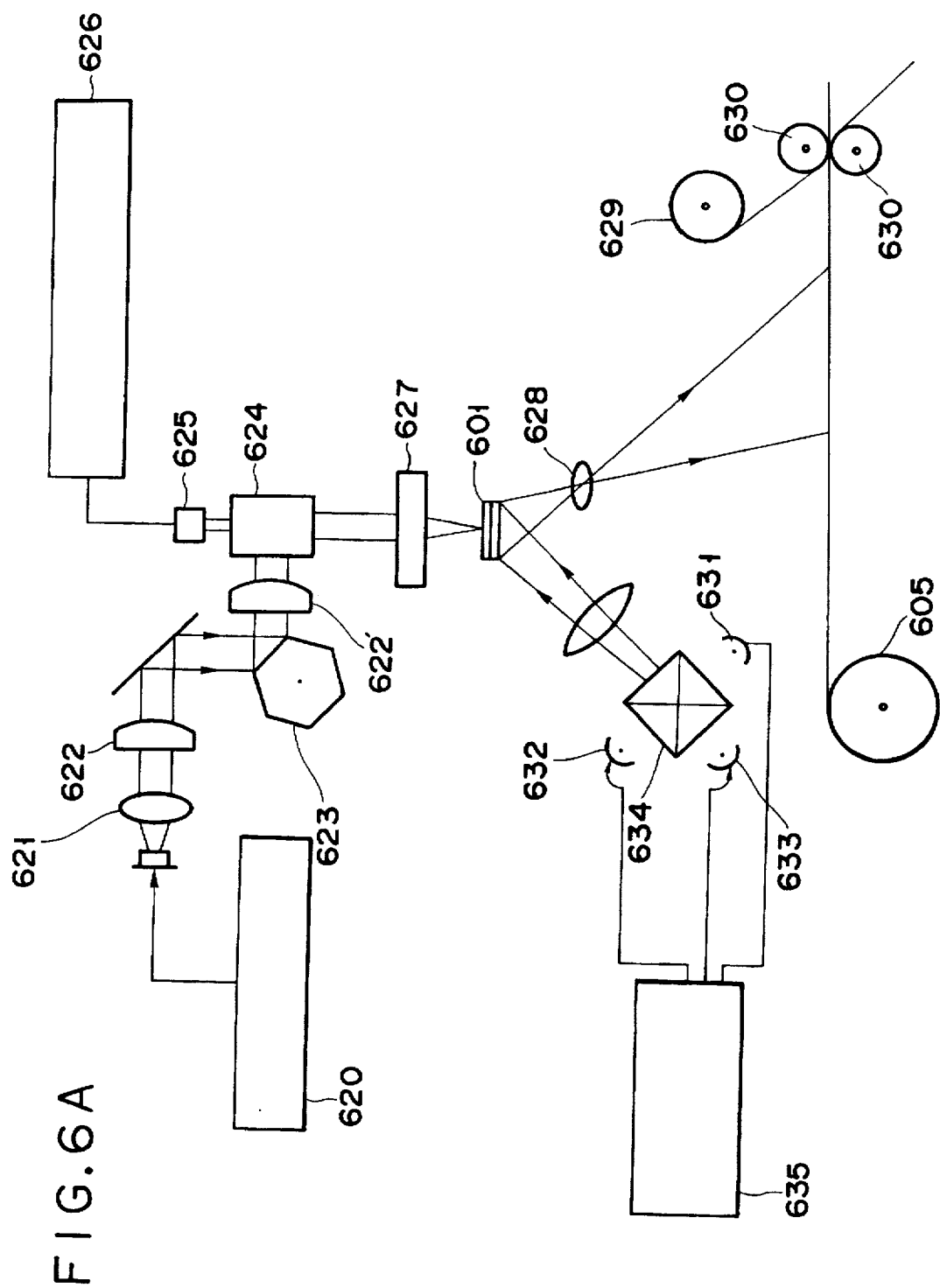

FIG. 6A shows an example wherein the recording medium of the present invention is applied to a system comprising exposing to light the capsule sheet coated with microcapsules in which a photocurable resin and a colorless dye are encapsulated, as typically disclosed in Japanese Patent Application Laid-open No. 59-30537, to cause the microcapsules to selectively cure, and thereafter breaking the capsules by the application of pressure or the like to form an image on a receiver sheet coated with a resin. In FIG. 6A, the numeral 620 denotes a laser modulated signal generator; 621, a semiconductor laser; 622 or 622', an f-θ lens; 623, an X-axis scanning mirror (polygon); 624, a Y-axis scanning mirror (galvanomirror); 625, Y-axis scanning lens drive; 626, Y-axis scanning drive signal generator; 627, an objective lens; 628, a projection lens; 629, a receiver sheet; 630, a pressure transfer unit; 631, B(blue)-corresponding light source unit; 632, R(red)-corresponding light source unit; 633, G(green)-corresponding light source unit; 634, a dichroic prism; and 635, a light-source selecting signal generator. Here, the semiconductor laser 621 is modulated and the polygon 623 and the galvanomirror 624 were used to write intermediate images corresponding to R, G and B in the recording medium 601 serving as an image bearing medium. On the intermediate image written in the recording medium 601, the R-corresponding wavelength light, G-corresponding wavelength light and B-corresponding wavelength light are successively irradiated through the dichroic mirror by means of the light source units, and then the intermediate image formed in the recording medium 601 is projected on the photosensitive sheet 605 through the projection lens 628 to effect exposure. The photosensitive sheet thus exposed is superposed onto the receiver sheet 629, which are then passed through the pressure transfer unit 630, so that an image is formed on the receiver sheet 629.

Figure 6B:
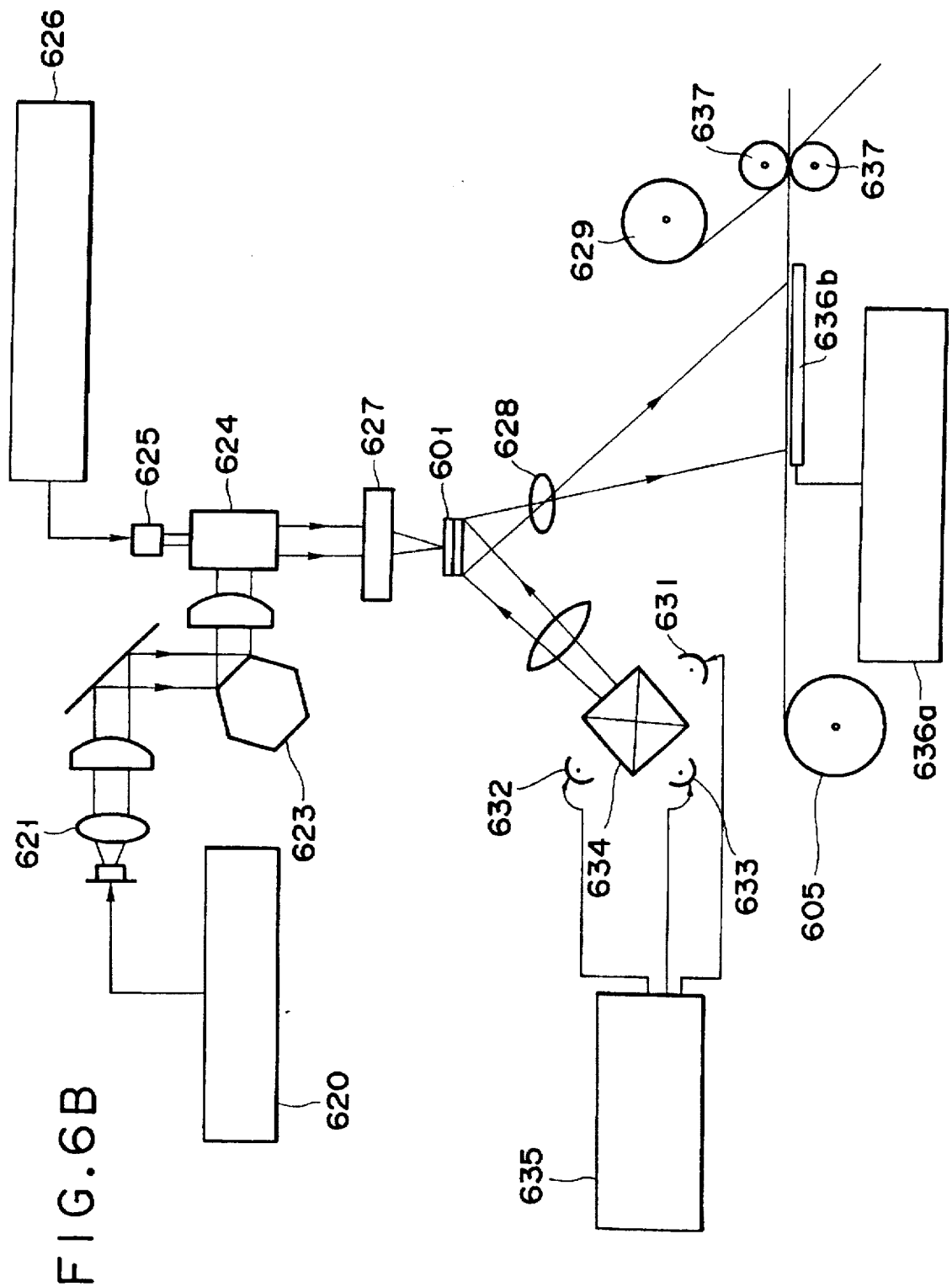

FIG. 6B shows an example wherein the recording medium of the present invention is applied to a system comprising applying light and heat to a capsule sheet coated with microcapsules in which a photocurable-thermosetting resin and a colorless dye are encapsulated, as typically disclosed in Japanese Patent Application Laid-open No. 62-174195, to cause the microcapsules to selectively cure or set, and thereafter breaking the capsules by the application of heat and pressure or the like to form an image on a receiver sheet. In FIG. 6B, the numerals 620 to 635 denote the same as those in FIG. 6A. The numeral 636a denotes a plane heating element drive unit; 636b, a plane heating element; and 637, pressure-heat transfer unit. The writing of an intermediate image and the irradiation from the light source unit are carried out in the same way as in the example shown in FIG. 6A. In synchronization with the irradiation of the R-corresponding wavelength light, G-corresponding wavelength light and B-corresponding wavelength light, the photosensitive member is heated by means of the plane heating element, and the intermediate image formed in the recording medium 601 is projected on the heated portion to effect exposure. The photosensitive sheet thus exposed is superposed onto the receiver sheet 629, which are then passed through the pressure-heat transfer unit 637, so that an image is formed on the receiver sheet 629.

Example 4

Figure 7B:
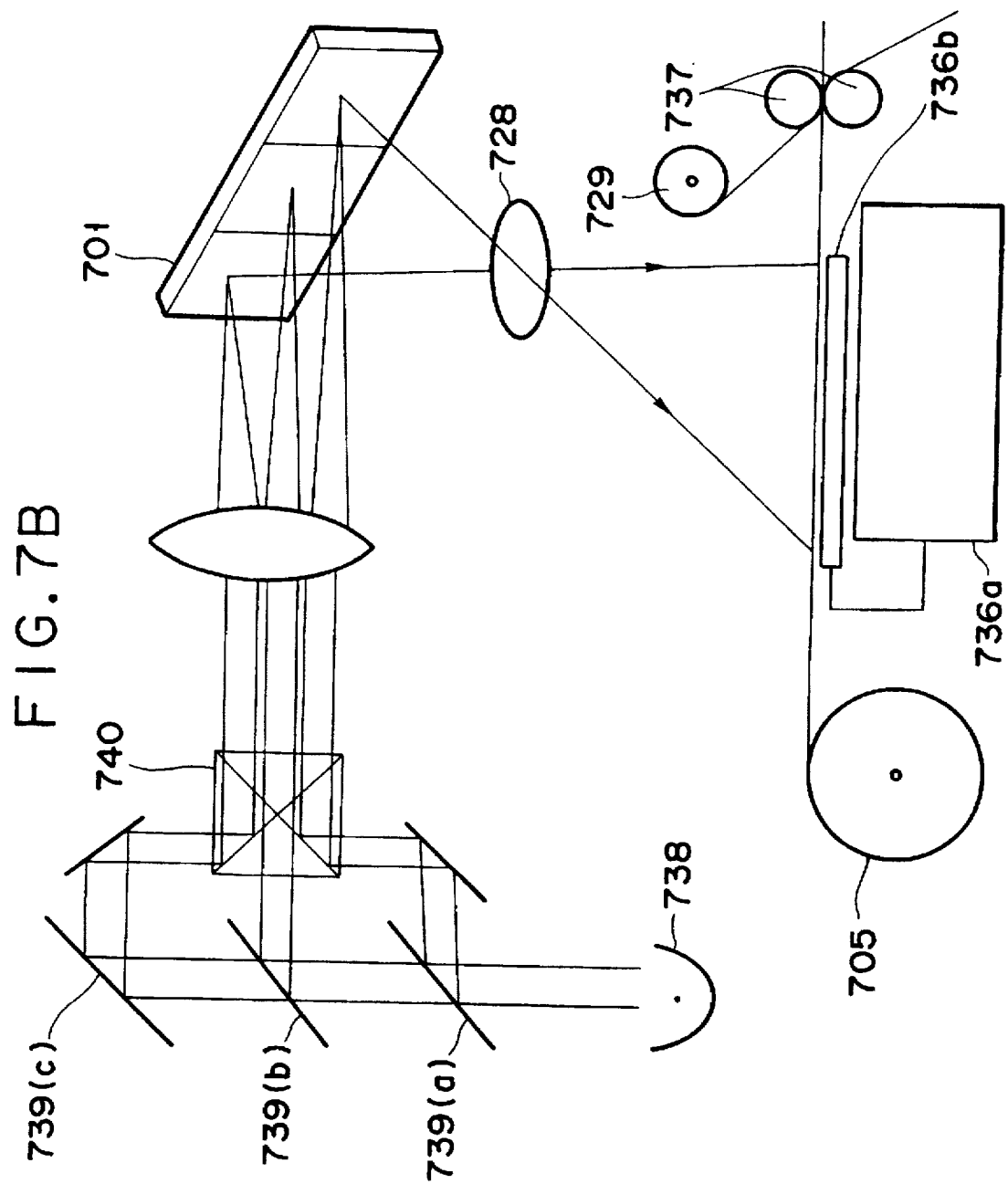

FIGS. 7A and 7B illustrate apparatus for carrying out flood exposure to R-, G- and B-corresponding wavelength light rays, using the photosensitive members used in Example 3, shown in FIGS. 6A and 6B, respectively.

In FIGS. 7A and 7B, the numerals 701, 705, 728, 729, 730, 736a, 736b and 737 correspond to the numerals 601, 605, 628, 629, 630, 636a, 636b and 637 in FIG. 6, respectively. The numeral 738 denotes a light source unit; 739(a), 739(b) and 739(c) each, a dichroic mirror; and 740, a dichroic prism.

Example 5

Figure 8A:
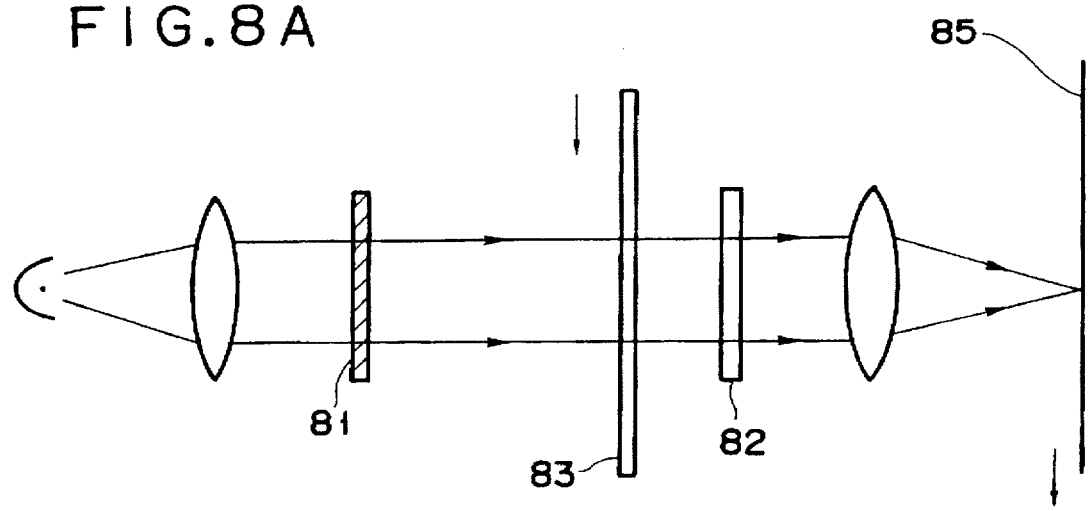
Figure 8B:
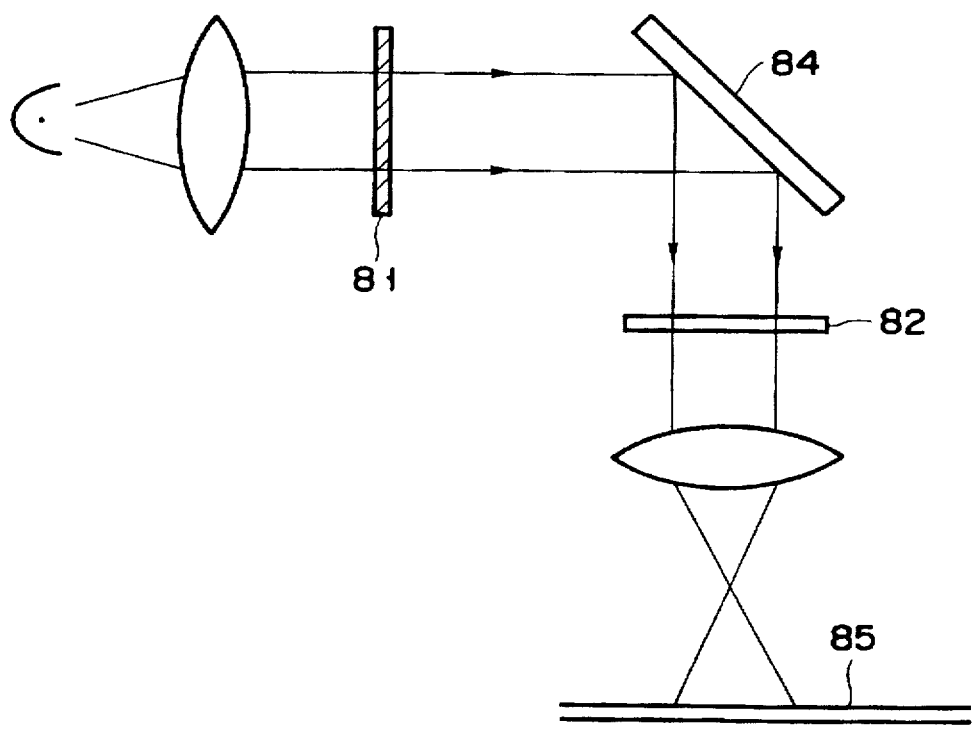

FIGS. 8A and 8B each show an example in which a projection optical system comprises a combination of a polarizer 81 and an analyzer 82. FIG. 8A shows an example in which a transmission type recording medium 83 is used, and FIG. 8B shows an example in which a reflection type recording medium 84 is used. In both examples, higher values than those in Example 3 were each obtained as a contrast on a sheet (a photosensitive member) 85. The sheet 85 may be comprised of a mere screen. Projection on the screen enabled display in a high contrast.

Example 6

Figure 9A:
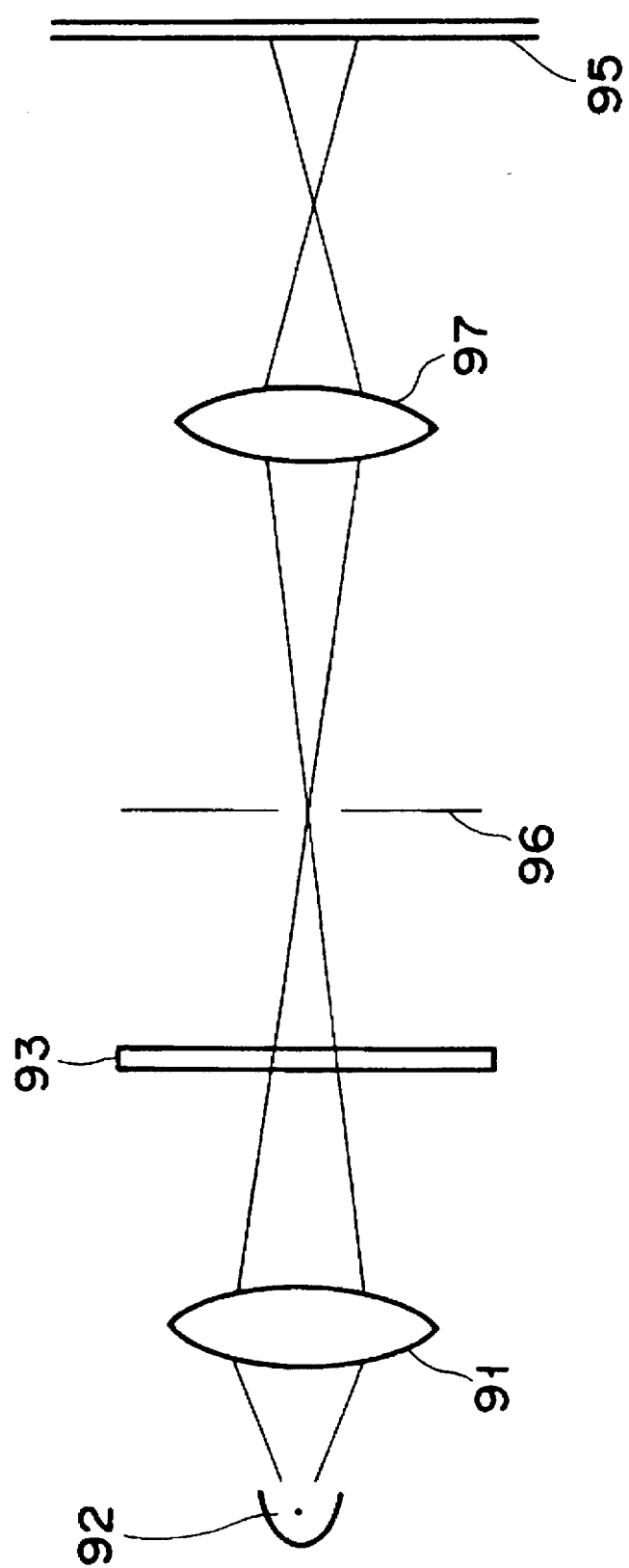
Figure 9B:
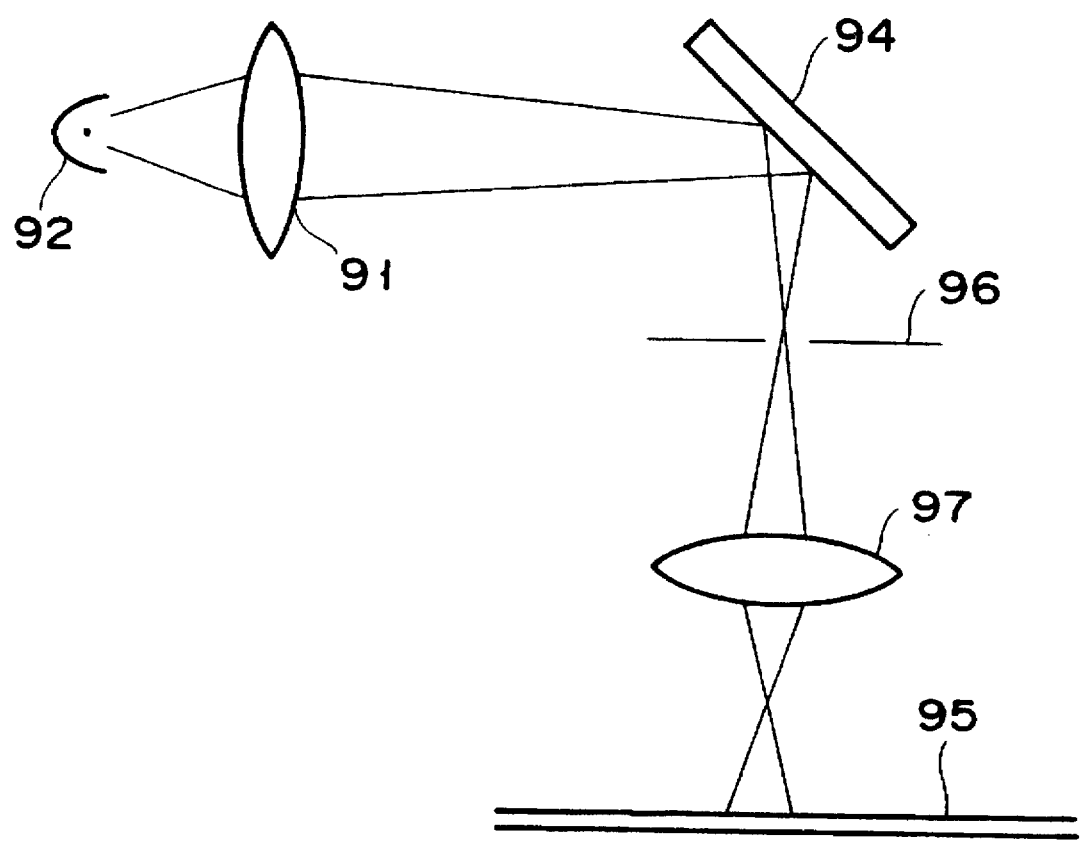

FIGS. 9A and 9B each schematically illustrate a recording medium projection apparatus making use of a Schlielen optical system. FIG. 9A shows an example in which a transmission type recording medium 93 is used, and FIG. 9B shows an example in which a reflection type recording medium 94 is used. In the drawings, the numeral 91 denotes a Schlielen lens; 92, a light source; 96, a mask; and 97 a projection lens. In both examples, higher values than those in Example 3 were each obtained as a contrast on a sheet (a photosensitive member) 95. When a polarizer and an analyzer are used in the above Schlielen optical system, it is possible to obtain a much higher contrast. The sheet 95 may be comprised of a mere screen. Projection on the screen enabled display in a high contrast.

Example 7

| | |
|---|---|
| Heat-diffusible dye | 1.8 parts |
| Oplas Red 330 (trade name; available from Orient Chemical Industries, Ltd.) | |
| Methyl methacrylate/butyl methacrylate copolymer | 1.0 part |
| Methyl ethyl ketone | 10 parts |
| 3,3'-Carbonylbis(7-methoxycoumarine) | 0.16 part |
| Ethyl p-dimethylaminobenzoate | 0.04 part |
| Pentaerythritol tetraacrylate | 2.0 parts | part(s): part(s) by weight

The above mixture was weighed out and dissolved using a paint shaker to give a coating solution.

A 6 µm thick polyester film was coated thereon with the above coating solution using an applicator so as to give a dried coating thickness of 2 µm. A polymerizing layer was thus provided, and a 3 µm thick polyvinyl alcohol (PVA) layer was further provided on that polymerizing layer.

On the photosensitive member thus prepared, an intermediate image holder comprised of the recording medium of the present invention on which an image had been held was superposed, followed by exposure to form a latent image.

A fluorescent lamp having a fluorescent peak at 390 nm was used as a light source, and the exposure was carried out for 1 second, setting the light source 5 cm distant from the recording material layer.

Thereafter, the intermediate image holder was removed, and the above photosensitive member was passed in 8 seconds through a thermal developing machine. The photosensitive member thus processed was further put on a hot plate heated to 60° C., which was then irradiated for 60 seconds with light from a fluorescent lamp having a fluorescent peak at 390 nm, with a distance of 5 cm.

Subsequently, the PVA film was removed. Using as an image receiving medium a synthetic paper on which an image receiving layer had been formed with a polyester resin, the photosensitive member and the image receiving medium were put together in such a way that the former's polymerizing layer and the latter's receiving layer faced to each other, followed by heating from photosensitive member side under conditions of 120° C. and 10 seconds so that a dye was diffusion-transferred from the polymerized layer to the image receiving layer. As a result, a sharp red color image corresponding with imagewise exposed areas was obtained on the image receiving layer. The above processing was carried out in a dark room on the whole.

Example 8

To 10 parts by weight of methyl ethyl ketone, 1.0 part by weight of polymethyl methacrylate, 2.0 parts by weight of Unideck 16-824 (trade name; available from Dainippon Ink & Chemicals, Incorporated), 0.2 part by weight of camphorquinone, 0.1 part by weight of ethyl p-dimethylbenzoate, 0.2 part by weight of FORON brilliant scarlet SRG (available from SANDOZ Co.) were added, and the mixture was dispersed using a paint shaker to give a coating solution.

A polyethylene terephthalate film vacuum-deposited with aluminum (available from PANAK Kogyo K.K.) was coated with the above coating solution (an emulsion) using an applicator so as to give a dried costing thickness of 2 μm. A transparent polyethylene terephthalate film was provided thereon in laminae to give a photosensitive member.

Image formation

On the photosensitive member thus prepared, an intermediate image holder making use of the recording medium of the present invention was superposed, followed by exposure to form a latent image.

A fluorescent lamp having a fluorescent peak at 390 nm was used as a light source, and the exposure was carried out for 10 seconds, setting the light source 5 cm distant from the image forming member.

Thereafter, the intermediate image holder was removed, and the temperature was adjusted to 100° C. The image forming member was then put on a hot plate heated to 60° C., and exposure was carried out for 20 seconds, setting a 380 nm, 15 W fluorescent lamp 5 cm distant from the member.

While the member thus processed was passed through rollers under application of heat and pressure at 60° C. and 25 kg/cm$^2$, respectively, the transparent polyethylene terephthalate film was peeled. As a result, a red negative image was formed on the film.

In the examples described above, a heat energy is used as the means for recording an image in the recording layer of the recording medium and light is used as the means for transferring the image to the photosensitive member, and hence an excellent durability can be achieved. Incorporation with an ultraviolet absorbent can also bring about an increase in light resistance.

Besides, using a similar method, it is also possible to transfer an optical image to silver salt photosensitive materials, dry-system silver salt photosensitive materials, photopolymer members such as photoresist members. This enables application of the present invention to the production of block copies.

Use of the recording medium as a microfilm makes it possible to copy out images by an electrophotographic system.

In the present examples, described are instances in which the recording means, erasing means, etc. are put together in one apparatus. The technical idea of the present invention is by no means limited to such instances, and includes embodiments in which they are set in cartridges, or separated into two processes.

As having been specifically shown in the above examples, the information on the recording medium according to the present invention can be rapidly rendered visible by projecting it through an analyzer and display it on a screen or transferring it on a photosensitive member, and yet can be faithfully reproduced without any deterioration compared with the original image.

Example 9

The same experiment as Example 1 was carried out using the same recording medium as used in Example 1 except that the recording layer was replaced with the following one. A sharp image was obtained as a result of the reproduction.

Recording layer

The polymeric liquid crystal compound described in Example 1: 80% by weight.

The polymeric liquid crystal compound of exemplary compound I-20: 20% by weight.

Example 10

On a substrate provided with the same photoconductive layer comprising amorphous silicon and the same dielectric mirror as in Example 1, a low-temperature baking polyimide (HL-1110; available from Hitachi Chemical Co., Ltd.) was spin-coated followed by baking to form a 500 Å thick aligning film, which was then monoaxially oriented by rubbing.

To the polymeric liquid crystal of the exemplary compound (52) previously set out (x=y=0.5; Mn measured by GPC: 8430; Mw: 18,560;

| | 35° C. | | 92° C. | | 109° C. | |
|---|---|---|---|---|---|---|
| SmX | — | SmC* | — | SmA | — | Iso. |

(SmX indicates an unidentified phase)

the low-molecular liquid crystal of the exemplary compound I-27 reviously set out was added in an amount of 15% by weight to form a recording layer.

Using a recording medium comprising the above recording layer, the same experiment was carried out in the same manner as in Example 1. It was confirmed that a sharp image was obtained.

In the present example, the erasure was effected by applying an electric field reverse to that for writing.

As having been described above, the present invention can provide an image forming method using a recording medium having a recording layer in a film form, and a method in which a pair of electrodes is used and a voltage is not applied therebetween continuously, then according to the present invention, image recording method capable of achieving a stable recording performance, a good memory performance and a high contrast can be provided, and makes it easy to provide a photosensitive apparatus that can promise a light load to semiconductor lasers, optical scanners, etc.

What is claimed is:

1. An image forming method comprising the steps of:
    forming electric charges on a photoconductive layer by charging a medium "A" comprising a conductive substrate having provided thereon said photoconductive layer, to form a charged recording medium "A";
    irradiating, after the step of charging, said charged recording medium "A" with a light corresponding to an image information, to form an irradiated medium "A" bearing an electrostatic latent image;
    selecting a medium "B" comprising a conductive substrate having provided thereon a recording layer containing a polymeric liquid crystal compound, said recording layer evidencing birefringence;
    bringing said irradiated medium "A" into contact with said medium "B" in order to transfer the electrostatic latent image formed on the photoconductive layer of said medium "A" to the recording layer of said medium "B";
    separating the medium "A" and the medium "B"; and
    writing the image information in the recording layer by uniformly heating the entire recording layer of said medium "B" and thereby imagewise changing the birefringence of said recording layer with in correspondence with the electrostatic latent image transferred from medium "A".

2. The image forming method according to claim 1, wherein, in the step of transfer, the photoconductive layer of said medium "A" and the recording layer of said medium "B" are so disposed as to face to each other, and a voltage is applied across both the mediums to form electric charges on the recording layer.

3. The image forming method according to claim 1 or 2, wherein said electric charges are formed by moving a charger assembly to the medium "A".

4. The image forming method according to claim 3, wherein said charger assembly is a corona charger.

5. The image forming method according to claim 1, wherein said recording layer is a recording layer containing a polymeric liquid crystal compound and a low-molecular liquid crystal compound.

6. An image reproducing method comprising the steps of;
 irradiating light on the recording medium in which an image has been formed by the image forming method according to claim 1; and
 displaying the image information on a screen or transferring the image information to a photosensitive member.

7. The image reproducing method according to claim 6, wherein said recording layer is a recording layer containing a polymeric liquid crystal compound and a low-molecular liquid crystal compound.

8. The image forming method according to claim 1, wherein the image forming is written by uniformly heating the entire recording layer of said medium "B" to a temperature above the glass transition temperature of said recording layer.

* * * * *

UNITED STATES PATENT AND TRADEMARK OFFICE
CERTIFICATE OF CORRECTION

PATENT NO. : 5,712,066

DATED : January 27, 1998

INVENTOR(S): KAZUO YOSHINAGA ET AL.

It is certified that error appears in the above-identified patent and that said Letters Patent is hereby corrected as shown below:

TITLE PAGE:

[56] REFERENCES CITED

Foreign Patent Documents
"2245735   10/1990" should read --2-245735 10/1990--.

[57] ABSTRACT

Line 1, "Provided" should read --Provided is--; and
   "of;" should read --of:--.

COLUMN 2

Line 2, "There" should read --This--.
Line 34, "as" should read --as an--.
Line 53, "is" should read --are--.
Line 59, "of;" should read --of:--.
Line 67, "an" should be deleted.

COLUMN 3

Line 8, "of;" should read --of:--.
Line 33, "of" should read --of:--.

COLUMN 5

Line 13, "has" should read --have--.

COLUMN 16

Line 9, "smectic→phase." should read --smectic A phase.--

UNITED STATES PATENT AND TRADEMARK OFFICE
CERTIFICATE OF CORRECTION

PATENT NO. : 5,712,066

DATED : January 27, 1998

INVENTOR(S): KAZUO YOSHINAGA ET AL.

It is certified that error appears in the above-identified patent and that said Letters Patent is hereby corrected as shown below:

COLUMN 18

Line 24, "has" should read --have--.
    Line 25, "has" should read --have--.

COLUMN 21

Line (51) "$-\underset{CH_3}{\overset{\cdot}{C}H}-O\!\!\xrightarrow{}_{y}\Big]$" should read -- $\Big[-\underset{CH_3}{\overset{\cdot}{C}H}-O\!\!\xrightarrow{}_{y}\Big]_n$ --.

COLUMN 27

Line 50, "may" should read --former may--.
    Line 51, "letter" should read --latter--.

COLUMN 29

Line 38, "s" should read --a--.

COLUMN 31

Line 36, "the the" should read --the--.

COLUMN 33

Line 33, "are" should read --is--.

UNITED STATES PATENT AND TRADEMARK OFFICE
CERTIFICATE OF CORRECTION

PATENT NO. : 5,712,066

DATED : January 27, 1998

INVENTOR(S) : KAZUO YOSHINAGA ET AL.

It is certified that error appears in the above-identified patent and that said Letters Patent is hereby corrected as shown below:

COLUMN 34

Line 15, "Cheinical" should read --Chemical--.

COLUMN 35

Line 6, "costing" should read --casting--.
    Line 63, "layer" should read --layer:--.

COLUMN 36

Line 63, "from" should read --from said--.

COLUMN 37

Line 12, "of;" should read --of:--.

Signed and Sealed this

Twenty-fourth Day of November, 1998

Attest:

BRUCE LEHMAN

Attesting Officer     Commissioner of Patents and Trademarks